US012450335B2

United States Patent
Lu

(10) Patent No.: US 12,450,335 B2
(45) Date of Patent: Oct. 21, 2025

(54) FILE ACCESS METHOD, COMMUNICATION SYSTEM, AND ELECTRONIC DEVICE

(71) Applicant: HUAWEI TECHNOLOGIES CO., LTD., Guangdong (CN)

(72) Inventor: Chao Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 18/467,015

(22) Filed: Sep. 14, 2023

(65) Prior Publication Data
US 2023/0418932 A1    Dec. 28, 2023

Related U.S. Application Data

(63) Continuation of application No. PCT/CN2022/080188, filed on Mar. 10, 2022.

(30) Foreign Application Priority Data

Mar. 17, 2021  (CN) ......................... 202110287567.1

(51) Int. Cl.
G06F 21/53         (2013.01)
G06F 21/62         (2013.01)

(52) U.S. Cl.
CPC .......... G06F 21/53 (2013.01); G06F 21/6209 (2013.01)

(58) Field of Classification Search
CPC .... G06F 21/53; G06F 21/604; G06F 21/6209; G06F 21/6218; G06F 21/6281; G06F 2221/2141; H04L 63/10–102; H04L 63/20
See application file for complete search history.

(56) References Cited

U.S. PATENT DOCUMENTS

| | | | | |
|---|---|---|---|---|
| 8,990,406 | B2 * | 3/2015 | Doss | H04W 4/80 709/227 |
| 2017/0353525 | A1 * | 12/2017 | Choi | H04W 12/068 |
| 2018/0349623 | A1 * | 12/2018 | Morard | G06F 21/6209 |
| 2021/0258367 | A1 * | 8/2021 | Dhanabalan | G06F 21/78 |

FOREIGN PATENT DOCUMENTS

| | | | | |
|---|---|---|---|---|
| CN | 105451161 | A | | 3/2016 |
| CN | 111679881 | A | | 9/2020 |
| CN | 112379965 | A | * | 2/2021 ......... G06F 9/45504 |
| CN | 112445762 | A | | 3/2021 |

* cited by examiner

*Primary Examiner* — Kevin Bechtel
(74) *Attorney, Agent, or Firm* — Fish & Richardson P.C.

(57) ABSTRACT

The present disclosure relates to file access methods. In one example method, a first electronic device receives a trigger operation performed by a user on a sandbox file in a shared interface sent by a second electronic device, and sends an access request to the second electronic device. The second electronic device receives the access request, and determines mapping information corresponding to the sandbox file based on the access request, where the mapping information includes a mapping file corresponding to the sandbox file, a path of the mapping file, and a correspondence between the path of the mapping file and file index information of the sandbox file. The second electronic device sends the mapping information to the first electronic device. The first electronic device receives the mapping information, and may directly access the sandbox file based on the mapping information.

15 Claims, 30 Drawing Sheets

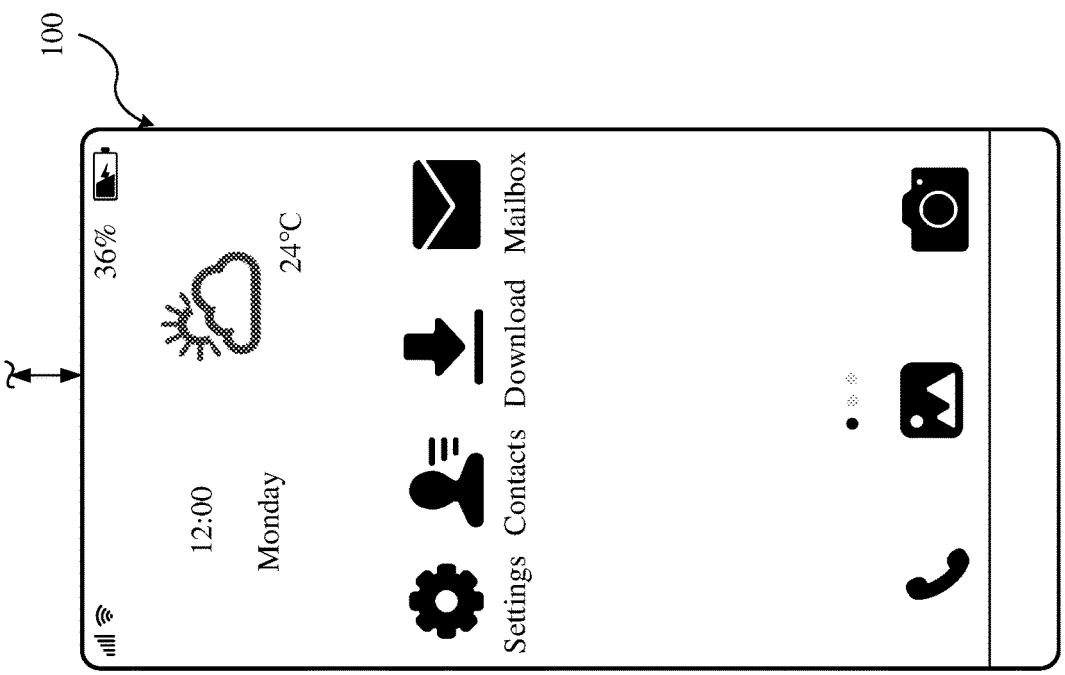

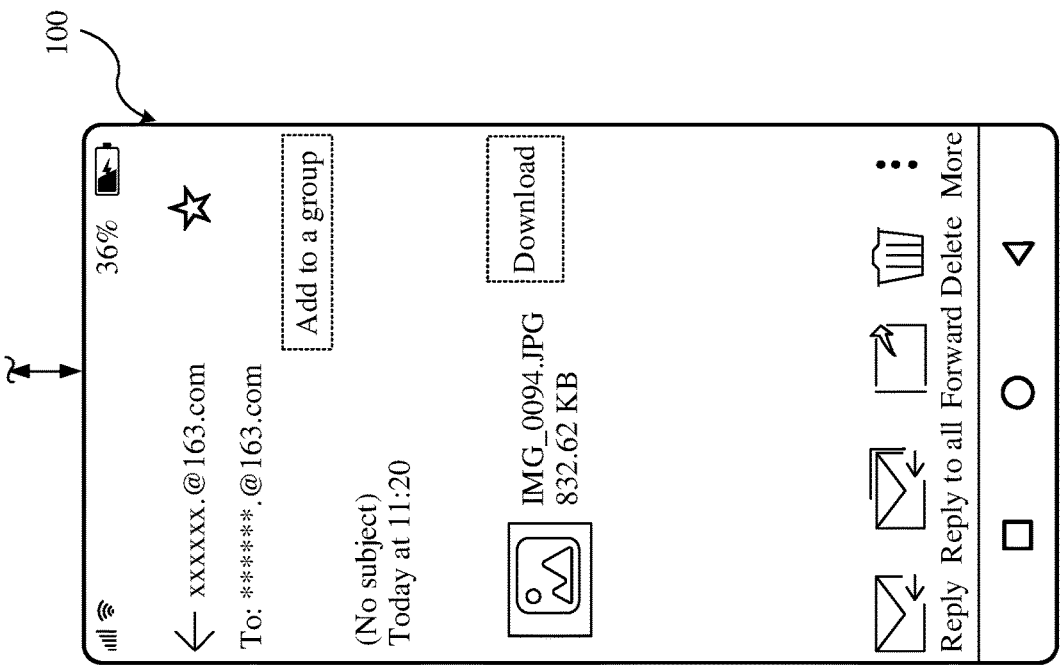

TO FIG. 5E-2

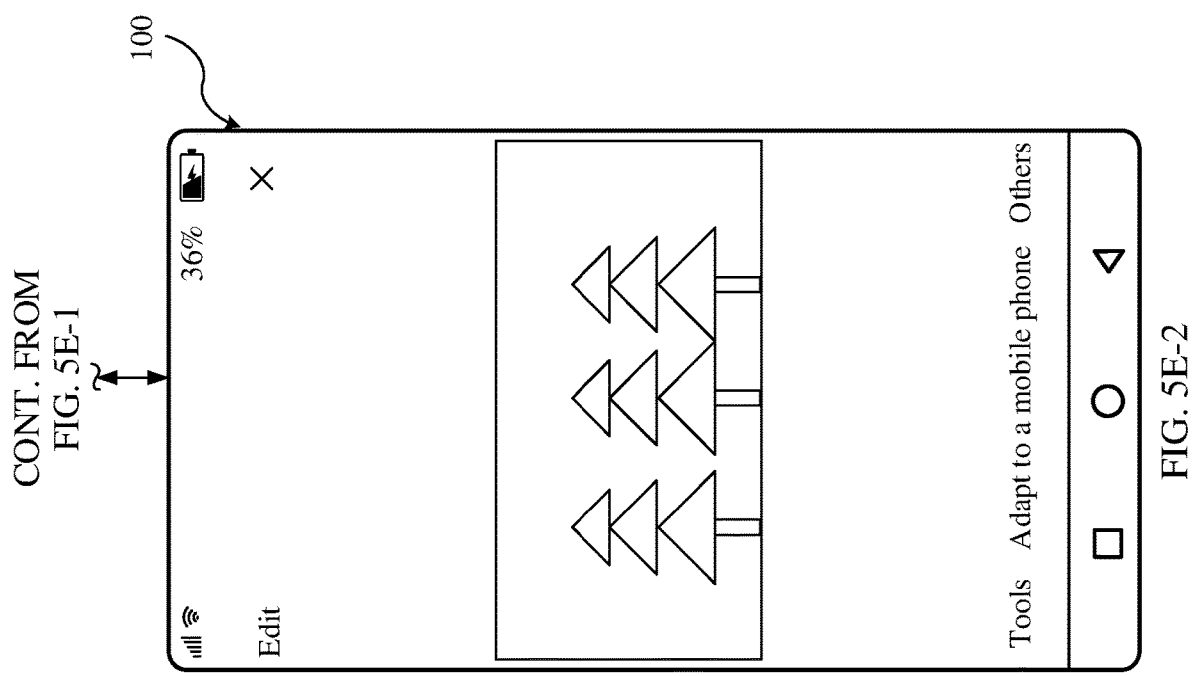

TO FIG. 7A-2

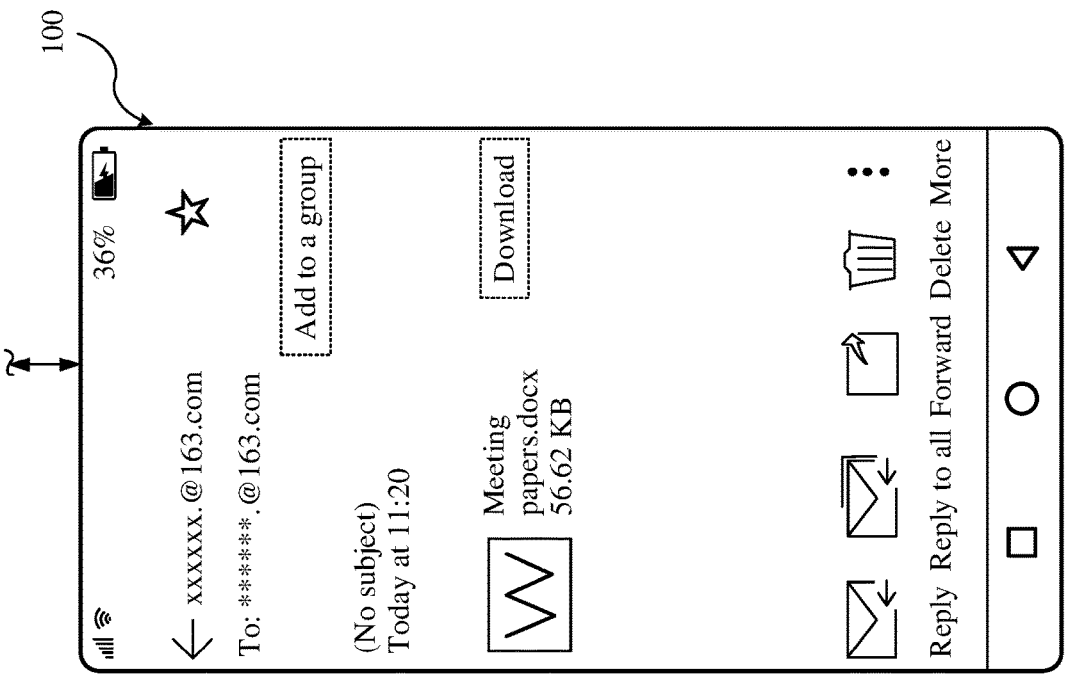

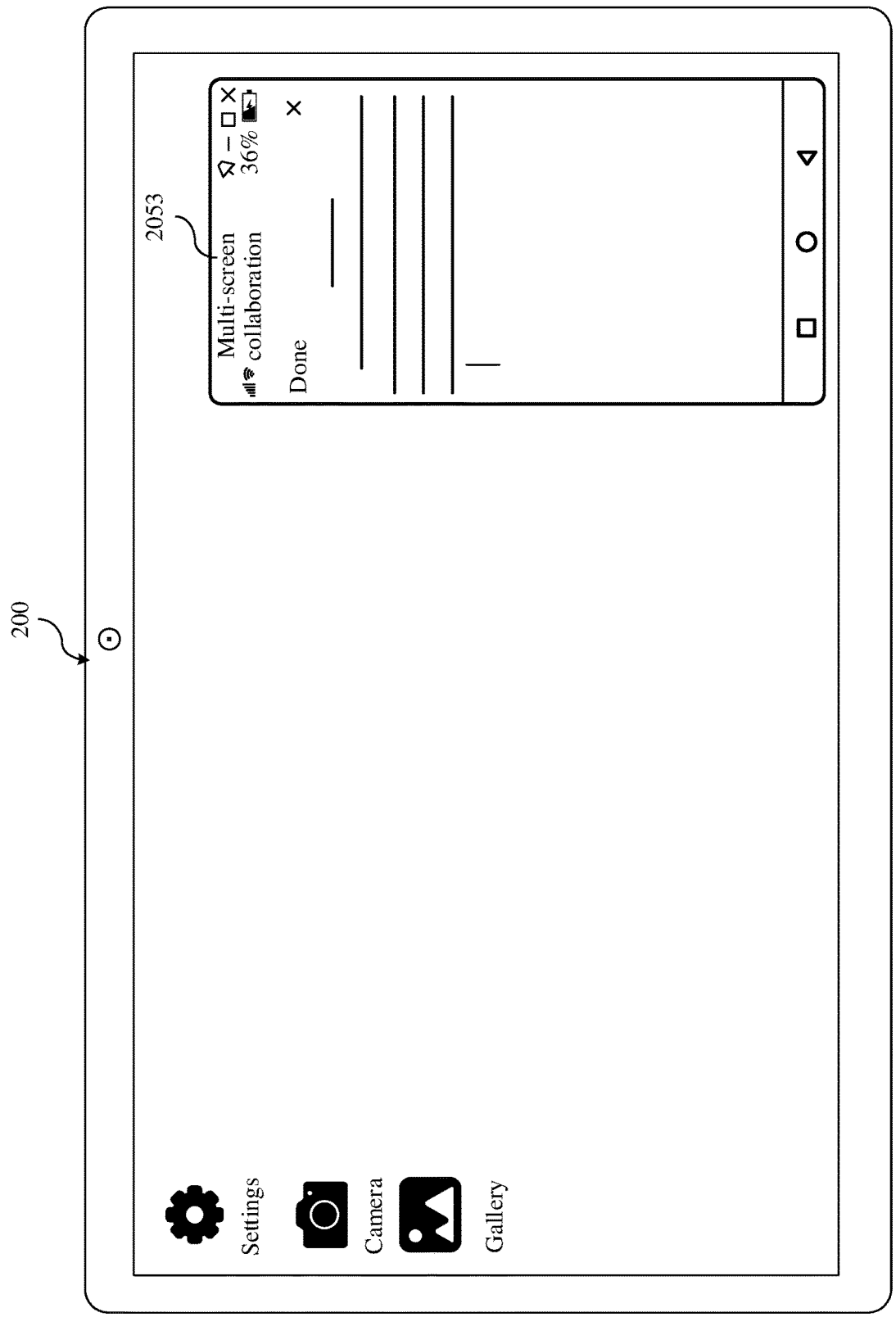

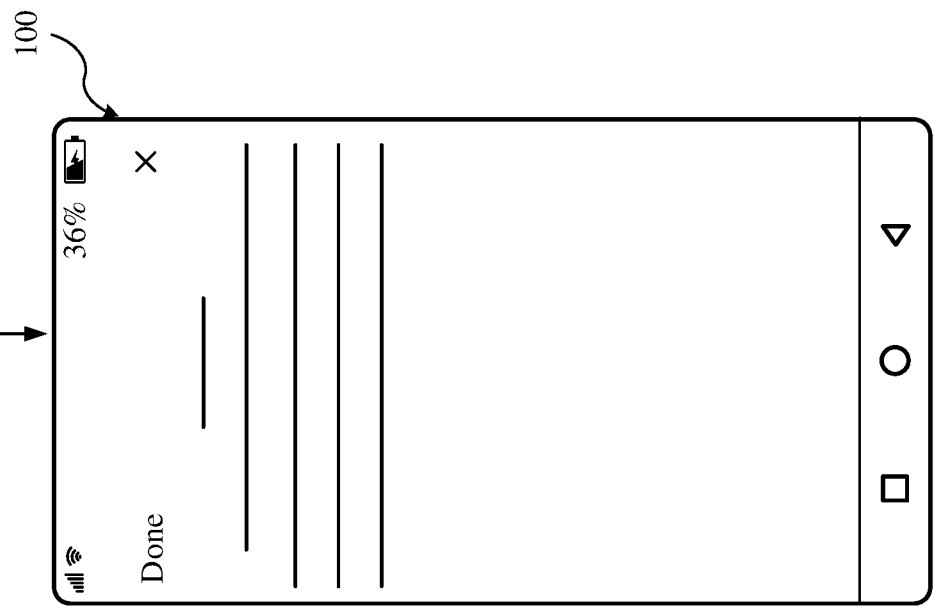

FILE ACCESS METHOD, COMMUNICATION SYSTEM, AND ELECTRONIC DEVICE

CROSS-REFERENCE TO RELATED APPLICATIONS

This application is a continuation of International Application No. PCT/CN2022/080188 filed on Mar. 10, 2022, which claims priority to Chinese Patent Application No. 202110287567.1 filed on Mar. 17, 2021. The disclosures of the aforementioned applications are hereby incorporated by reference in their entireties.

TECHNICAL FIELD

This application relates to the field of computer technologies, and in particular, to a file access method, a communication system, and an electronic device.

BACKGROUND

A sandbox is a security mechanism that provides an isolated environment for a program running on an electronic device. The sandbox strictly controls a resource accessed by the running program to ensure system security. In the electronic device, a file protected according to a sandbox principle may be generally referred to as a sandbox file. For example, a file protected according to the sandbox principle in an application of an electronic device is a sandbox file. Generally, the application of the electronic device may access the sandbox file corresponding to the application, and another application of the electronic device or an application of another electronic device generally has no permission to access the sandbox file. Alternatively, another application can access the sandbox file only when being authorized.

With popularization of electronic devices such as a mobile phone and a personal computer (PC), a related technology for collaboration between the electronic devices is widely used. For example, collaboration may be performed between the PC and the mobile phone. In a current process of performing collaboration between the PC and the mobile phone, the PC displays a shared interface shared by the mobile phone, and by using the shared interface, the PC can open some files such as a document and an image stored in the mobile phone, and even edit these files. However, the PC cannot perform operations such as opening and editing on a sandbox file corresponding to an application of the mobile phone. This affects user experience.

SUMMARY

This application provides a file access method, a communication system, and an electronic device, to resolve a problem in the conventional technology that electronic devices cannot operate sandbox files of each other, so as to implement better interaction between the electronic devices and improve user experience.

To resolve the foregoing technical problem, according to a first aspect, an implementation of this application provides a file access method, applied to a communication system including a first electronic device and a second electronic device. The first electronic device establishes a communication connection to the second electronic device. The method includes: The first electronic device displays a shared interface sent by the second electronic device, where the shared interface includes a sandbox file corresponding to an application of the second electronic device; the first electronic device receives a trigger operation performed by a user on the sandbox file, and sends an access request to the second electronic device; the second electronic device receives the access request, and determines, based on the access request, mapping information corresponding to the sandbox file, where the mapping information includes a mapping file corresponding to the sandbox file, a path of the mapping file, and a correspondence between the path of the mapping file and file index information of the sandbox file; the second electronic device sends the mapping information to the first electronic device; and the first electronic device receives the mapping information, and accesses the sandbox file based on the mapping information.

According to the file access method provided in this application, the first electronic device may directly access, based on the mapping information corresponding to the sandbox file, the sandbox file corresponding to the application of the second electronic device, so that an effect of interaction between the first electronic device and the second electronic device can be improved, and user experience can be improved.

In a possible implementation of the first aspect, that the first electronic device establishes a communication connection to the second electronic device may mean that the first electronic device and the second electronic device establish a communication connection that enables a collaboration function between the devices.

In a possible implementation of the first aspect, the sandbox file corresponding to the application of the second electronic device may be a sandbox file in the application, for example, may be an email attachment such as an image or a document corresponding to a mailbox application of the second electronic device. That is, by using the file access method provided in this implementation, the first electronic device can directly access the email attachment in the mailbox of the second electronic device. Certainly, the sandbox file may also be another file that is in the electronic device and that is generally allowed to be accessed by only the application.

In a possible implementation of the first aspect, that the second electronic device determines, based on the access request, the mapping information corresponding to the sandbox file includes: The second electronic device determines the sandbox file based on the access request; the second electronic device determines a uniform resource identifier corresponding to the sandbox file, and determines, based on the uniform resource identifier, the file index information corresponding to the uniform resource identifier; and the second electronic device determines the mapping information based on the uniform resource identifier and the file index information.

In a possible implementation of the first aspect, that the first electronic device accesses the sandbox file based on the mapping information includes: The first electronic device determines the mapping file and the file index information based on the path of the mapping file; and the first electronic device accesses the sandbox file based on the mapping file and the file index information.

The first electronic device may determine, based on the path of the mapping file, the mapping file corresponding to the path of the mapping file, and the first electronic device may determine, based on the path of the mapping file and the correspondence between the path of the mapping file and the file index information of the sandbox file, the file index information corresponding to the path of the mapping file. Then, the first electronic device may determine the sandbox file based on the mapping file, and may access the sandbox file based on the file index information corresponding to the sandbox file. That is, the first electronic device may directly access the sandbox file based on the mapping file and the file index information.

In a possible implementation of the first aspect, the mapping file is a soft link file, and the mapping file includes location information of the sandbox file.

In a possible implementation of the first aspect, the file index information is a file descriptor.

The first electronic device may determine a location of the sandbox file based on the location information of the sandbox file in the soft link file, and may perform an operation such as opening or reading/writing the sandbox file based on the file descriptor, to access the sandbox file.

In a possible implementation of the first aspect, the access request includes operation type information and operation area information corresponding to the trigger operation.

The operation type information may be, for example, a click operation performed by a user on a sandbox file, and the operation area information may be, for example, coordinates of a location at which the user clicks the sandbox file. The second electronic device may determine, based on the operation type information and the operation area information, the sandbox file to be accessed by the first electronic device.

According to a second aspect, an implementation of this application provides a file access method, applied to a communication system including a first electronic device and a second electronic device. The first electronic device establishes a communication connection to the second electronic device. The first electronic device includes a first collaborative application and a first file sharing module, and the second electronic device includes a second collaborative application, a second file sharing module, and a target operation application. The method includes: The first collaborative application displays a shared interface that is of the second electronic device and that is sent by the second collaborative application, where the shared interface includes a sandbox file corresponding to the target operation application of the second electronic device; the first collaborative application receives a trigger operation performed by a user on the sandbox file, and sends an access request to the second collaborative application; the second collaborative application receives the access request, enables, based on the access request, the second file sharing module to determine mapping information corresponding to the sandbox file, where the mapping information includes a mapping file corresponding to the sandbox file, a path of the mapping file, and a correspondence between the path of the mapping file and file index information of the sandbox file; the second file sharing module sends the mapping file and the correspondence between the path of the mapping file and the file index information of the sandbox file to the first file sharing module, and the second file sharing module sends the path of the mapping file to the second collaborative application; the second collaborative application sends the path of the mapping file to the first collaborative application; and the first collaborative application receives the path of the mapping file, determines, from the second file sharing module based on the path of the mapping file, the mapping file and the file index information that correspond to the path of the mapping file, and accesses the sandbox file based on the mapping file and the file index information.

According to the file access method provided in this application, the first collaborative application may determine, based on the path of the mapping file, the mapping file corresponding to the path of the mapping file in the second file sharing module, and the first collaborative application may determine, based on the path of the mapping file and the correspondence between the path of the mapping file in the second file sharing module and the file index information of the sandbox file, the file index information corresponding to the path of the mapping file. Then, the first collaborative application may determine the sandbox file based on the mapping file, and may access the sandbox file based on the file index information corresponding to the sandbox file. That is, the first collaborative application may directly access the sandbox file based on the mapping file and the file index information. That is, the first electronic device may directly access, based on the mapping information corresponding to the sandbox file, the sandbox file corresponding to the application of the second electronic device, so that an effect of interaction between the first electronic device and the second electronic device can be improved, and user experience can be improved.

In a possible implementation of the second aspect, the second electronic device further includes a content provider module. That the second collaborative application enables, based on the access request, the second file sharing module to determine the mapping information corresponding to the sandbox file includes: The second collaborative application determines the sandbox file based on the access request; the second collaborative application obtains a uniform resource identifier corresponding to the sandbox file from the target operation application corresponding to the sandbox file, and sends the uniform resource identifier to the second file sharing module; the second file sharing module receives the uniform resource identifier, and obtains, from the content provider module based on the uniform resource identifier, file index information corresponding to the uniform resource identifier; and the second file sharing module generates the mapping file based on the uniform resource identifier and the file index information, stores the mapping file in a shared directory of the second file sharing module, determines the path of the mapping file, determines the correspondence between the path of the mapping file and the file index information, and stores the correspondence in a data structure of the second file sharing module.

In a possible implementation of the second aspect, the method further includes: The second collaborative application invokes a soft link interface of the second file sharing module to send the uniform resource identifier to the second file sharing module, so that the second file sharing module determines the mapping information.

In a possible implementation of the second aspect, the second file sharing module obtains, from the content provider module based on the uniform resource identifier through an Android interface definition language interface of the content provider module, the file index information corresponding to the uniform resource identifier.

In a possible implementation of the second aspect, the mapping file is a soft link file, and the mapping file includes location information of the sandbox file.

In a possible implementation of the second aspect, the file index information is a file descriptor.

In a possible implementation of the second aspect, the access request includes operation type information and operation area information corresponding to the trigger operation.

According to a third aspect, an implementation of this application provides a file access method, applied to a first electronic device. The method includes: The first electronic device displays a shared interface sent by a second electronic device that establishes a communication connection to the first electronic device, where the shared interface includes a sandbox file corresponding to an application of the second electronic device; the first electronic device receives a trigger operation performed by a user on the sandbox file, and sends an access request to the second electronic device; and the first electronic device receives mapping information sent by the first electronic device, and accesses the sandbox file based on the mapping information, where the mapping information is information that corresponds to the sandbox file determined by the second electronic device based on the access request, and the mapping information includes a mapping file corresponding to the sandbox file, a path of the mapping file, and a correspondence between the path of the mapping file and file index information of the sandbox file.

According to a fourth aspect, an implementation of this application provides a file access method, applied to a second electronic device. The method includes: The second electronic device receives an access request sent by a first electronic device that establishes a communication connection to the second electronic device, and determines, based on the access request, mapping information corresponding to a sandbox file that the first electronic device requests to access, where the mapping information includes a mapping file corresponding to the sandbox file, a path of the mapping file, and a correspondence between the path of the mapping file and file index information of the sandbox file, the access request is a request generated by receiving, by the first electronic device, a trigger operation performed by a user on the sandbox file, and the sandbox file is a file that corresponds to an application of the second electronic device and that is included in a shared interface that is sent by the second electronic device and displayed by the first electronic device; and the second electronic device sends the mapping information to the first electronic device, so that the first electronic device accesses the sandbox file based on the mapping information.

According to a fifth aspect, an implementation of this application provides a communication system including a first electronic device and a second electronic device. The first electronic device establishes a communication connection to the second electronic device. The first electronic device is configured to display a shared interface sent by the second electronic device, and the shared interface includes a sandbox file corresponding to an application of the second electronic device. The first electronic device is further configured to: receive a trigger operation performed by a user on the sandbox file, and send an access request to the second electronic device. The second electronic device is configured to: receive the access request, and determine, based on the access request, mapping information corresponding to the sandbox file. The mapping information includes a mapping file corresponding to the sandbox file, a path of the mapping file, and a correspondence between the path of the mapping file and file index information of the sandbox file. The second electronic device is further configured to send the mapping information to the first electronic device. The first electronic device is further configured to: receive the mapping information, and access the sandbox file based on the mapping information.

The communication system provided in this application includes an electronic device configured to perform the file access method provided in any one of the first aspect and/or the possible implementations of the first aspect. Therefore, beneficial effects (or advantages) of the file access method provided in the first aspect can also be implemented.

According to a sixth aspect, an implementation of this application provides an electronic device, including: a memory, configured to store a computer program, where the computer program includes program instructions; and a control component, configured to execute the program instructions, to enable the electronic device to perform the file access method provided in any one of the foregoing possible implementations.

According to a seventh aspect, an implementation of this application provides a computer-readable storage medium. The computer-readable storage medium stores a computer program, the computer program includes program instructions, and the program instructions are run by a computer, to enable the computer to perform the file access method provided in any one of the foregoing possible implementations.

According to an eighth aspect, an embodiment of this application provides a computer program product. When the computer program product is run on an electronic product, the electronic product is enabled to perform the file access method described above.

It may be understood that, for beneficial effects of the second aspect to the seventh aspect, refer to related descriptions in the first aspect. Details are not described herein again.

BRIEF DESCRIPTION OF DRAWINGS

To describe technical solutions in this application more clearly, the following briefly describes accompanying drawings used for describing implementations.

FIG. 2A-1 to FIG. 2B-2 are schematic diagrams of some interfaces of a mobile phone 100 and a PC 200 in the conventional technology according to some implementations of this application;

FIG. 5A-1 to FIG. 5E-2 are schematic diagrams of some interfaces of a mobile phone 100 and a PC 200 provided in this application according to some implementations of this application;

FIG. 7A-1 to FIG. 7C-2 are schematic diagrams of other interfaces of a mobile phone 100 and a PC 200 provided in this application according to some implementations of this application;

DESCRIPTION OF EMBODIMENTS

The following further clearly describes technical solutions in this application with reference to the accompanying drawings.

Figure 1:
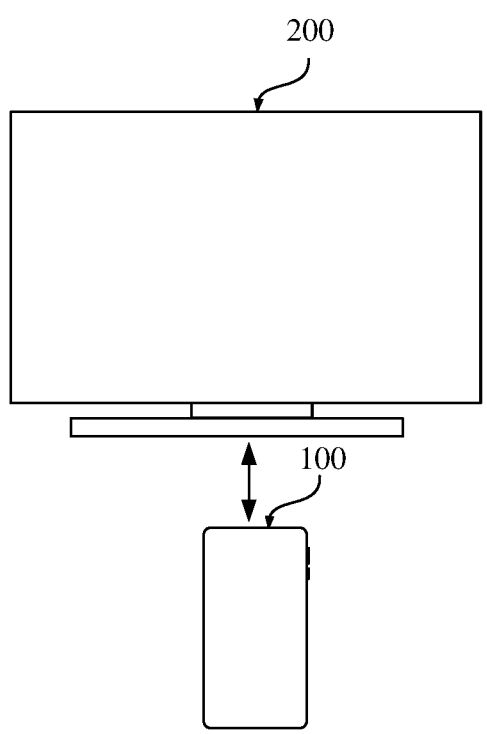
FIG. 1 is a schematic diagram of a communication system provided in this application according to some implementations of this application.

Refer to FIG. 1. This application provides a communication system, including a mobile phone 100 and a PC 200 (a desktop computer is used as an example of the PC 200). The mobile phone 100 and the PC 200 may establish a communication connection (or may be referred to as a network communication connection) like Wi-Fi, Bluetooth, or near field communication (NFC) to each other, and the mobile phone 100 and the PC 200 may enable a collaboration function between the mobile phone 100 and the PC 200 based on the communication connection to perform a collaboration operation. A manner and a process of establishing a communication connection between the mobile phone 100 and the PC 200 may be the same as a manner and a process of establishing a communication connection like Wi-Fi, Bluetooth, or NFC between currently common electronic devices. Details are not described in this application.

Figures 1, 2A:
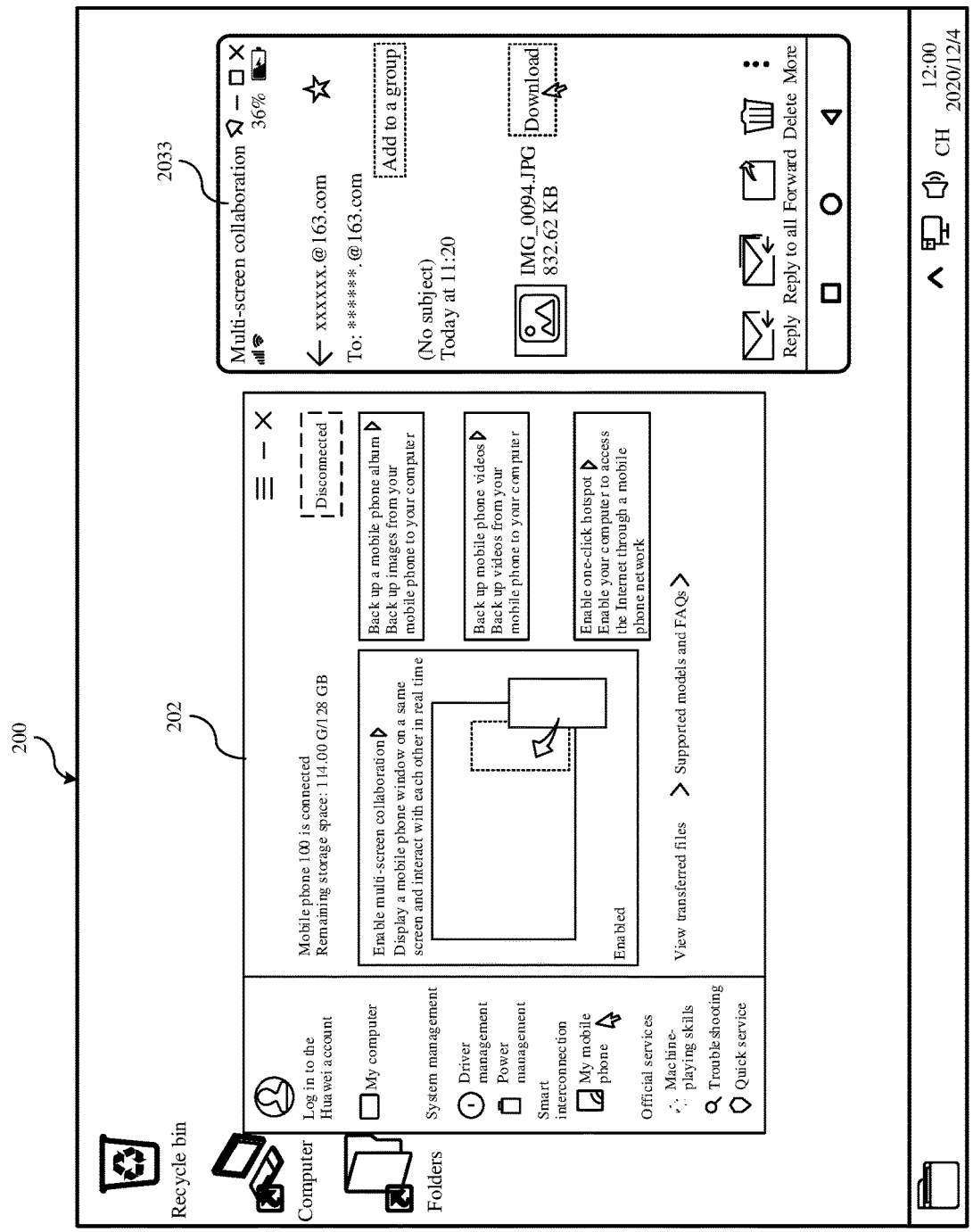
Figures 2, 2A:
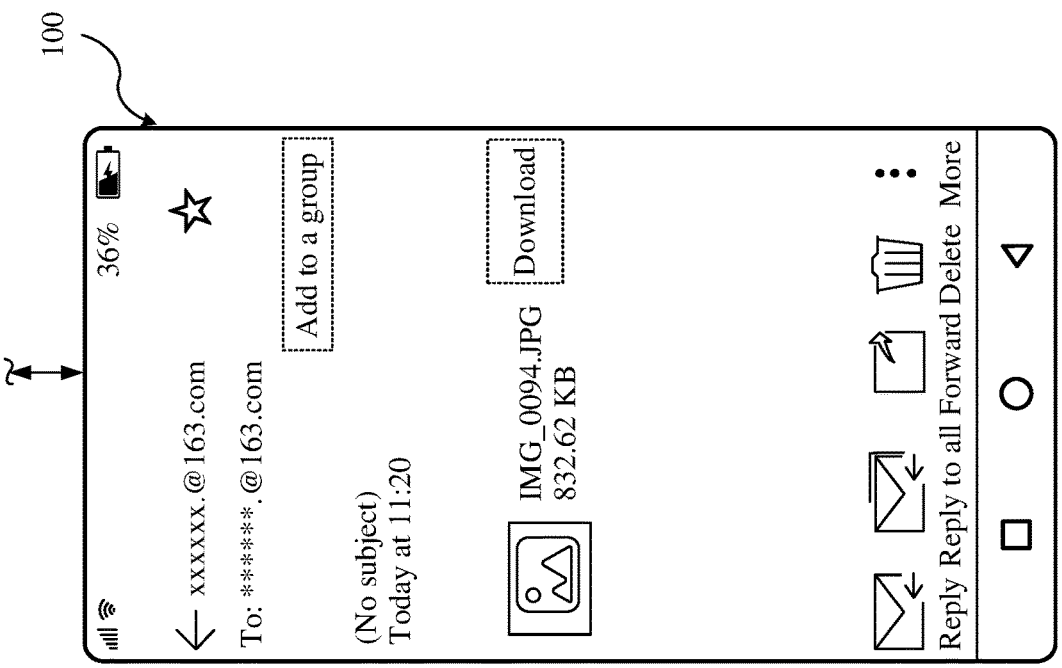

Refer to FIG. 2A-1 and FIG. 2A-2. In an implementation of this application, the mobile phone 100 and the PC 200 establish an NFC communication connection, and the mobile phone 100 and the PC 200 enable a collaboration function between each other. The PC 200 displays a setting interface 202 and an email display interface 2033 that are shown in FIG. 2A-1 and FIG. 2A-2. The setting interface 202 is used by a user to perform management operations such as collaboration and communication connection on the mobile phone 100 by using the PC 200. The email display interface 2033 is a shared interface shared by the mobile phone 100 to the PC 200. The email display interface 2033 includes sender information "xxxxxx.@163.com", recipient information "****.@163.com", and an image file "IMG_0094.JPG" used as an email attachment (the email attachment may also be referred to as an email attachment file). In addition, the email display interface 2033 further includes a "Download" control corresponding to the email attachment. If the PC 200 detects a click operation performed by the user on the "Download" control, the PC 200 performs an operation of downloading the email attachment. Certainly, the email display interface 2033** further includes controls and information such as Reply, Reply to all, Forward, Delete, More, and Add to a group.

Figures 1, 2B:
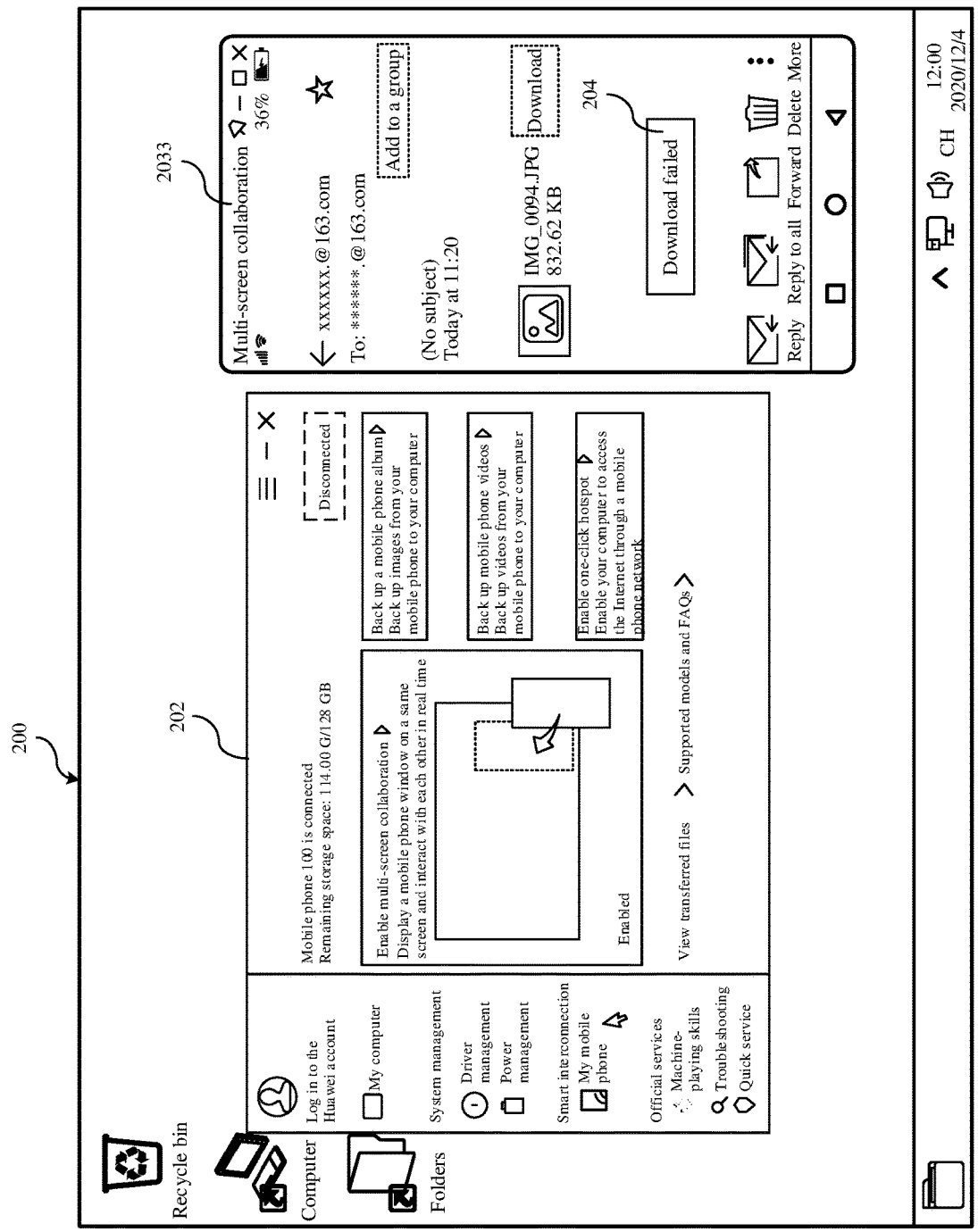
Figures 2, 2B:
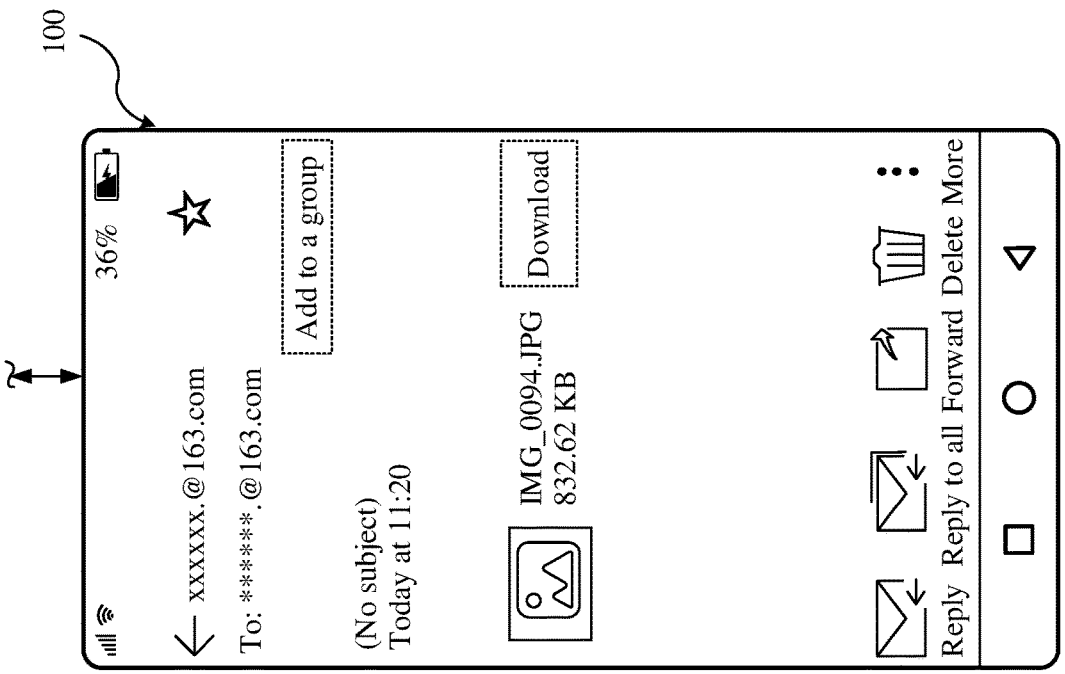

Because the email attachment in a mailbox application of the mobile phone 100 is a sandbox file, in a process in which the PC 200 performs a collaboration operation on the mobile phone 100, the PC 200 usually cannot access the email attachment. For example, the PC 200 cannot download the email attachment. In an implementation of this application, the PC 200 cannot download an email attachment, and displays prompt information 204 "Download failed" shown in FIG. 2B-1 and FIG. 2B-2.

In a process in which the PC 200 performs collaboration on the mobile phone 100, the PC 200 cannot access an email attachment that is used as a sandbox file and that corresponds to a mailbox application of the mobile phone 100, that is, cannot perform collaboration operations such as downloading, opening, and editing on the email attachment. Therefore, an effect of collaboration between the PC 200 and the mobile phone 100 is affected, and user experience is affected.

This application provides a file access method, applied to the foregoing communication system. If the PC 200 detects a click operation (the click operation is used as an example of a trigger operation) performed by a user on a "Download" control corresponding to an email attachment, the PC 200 sends an access request to the mobile phone 100. The access request includes access action information that the user clicks a mouse and that corresponds to the click operation performed by the user on the "Download" control and coordinate information of a location at which the user performs a click operation on an email display interface 2033 used as a shared interface. The PC 200 requests, from the mobile phone 100 by using the access request, to obtain a soft link corresponding to the email attachment, a path of the soft link, and a correspondence (or may be referred to as a mapping relationship) between the path of the soft link and a file descriptor (fd). The soft link is actually a text file. Therefore, the soft link may also be referred to as a soft link file. The soft link includes location information of the email attachment. The location information may be, for example, an absolute path of the email attachment. The absolute path includes information such as a package name, a relative path, and a name that correspond to the email attachment. The fd is information required for accessing a file (such as an email attachment). For example, the fd is used to determine a file to be opened or to be read or written. The file descriptor is a non-negative integer. The PC 200 may determine, based on the path of the soft link, the soft link and the fd that correspond to the path of the soft link. Then, the PC 200 may determine, based on the fd and the location information of the email attachment in the soft link, the email attachment in a mailbox application of the mobile phone 100, and may directly access the email attachment. That is, for example, the PC 200 may download the image file "IMG_0094.JPG" of the email attachment.

According to the file access method provided in this application, the mobile phone 100 separately sends the soft link corresponding to the email attachment, the path of the soft link, and the correspondence between the path of the soft link and the fd to the PC 200, so that when the PC 200 needs to access the email attachment used as a sandbox file, the PC 200 may determine, by using the path of the soft link, the soft link corresponding to the path of the soft link. In addition, the PC 200 may "view" (that is, query or link) the email attachment in the mailbox application of the mobile phone 100 by using the soft link. In addition, the PC 200 may further determine, based on the correspondence between the path of the soft link and the fd, the fd required for accessing the email attachment. According to the file access method provided in this application, the PC 200 may directly access, based on the soft link and the fd, the email attachment in the mailbox application of the mobile phone 100, so that effects of interaction and a collaboration operation performed by the PC 200 on the mobile phone 100 can be effectively improved, and user experience can be improved.

In addition, according to the file access method provided in this application, the PC 200 may access, by using the soft link and the fd, the email attachment used as a sandbox file, and the PC 200 does not need to copy the email attachment from the mobile phone 100 to the PC 200. This can effectively reduce file copy time, improve file access efficiency, save memory of the PC 200, and improve effects of interaction and collaboration between the PC 200 and the mobile phone 100.

Figure 3A:
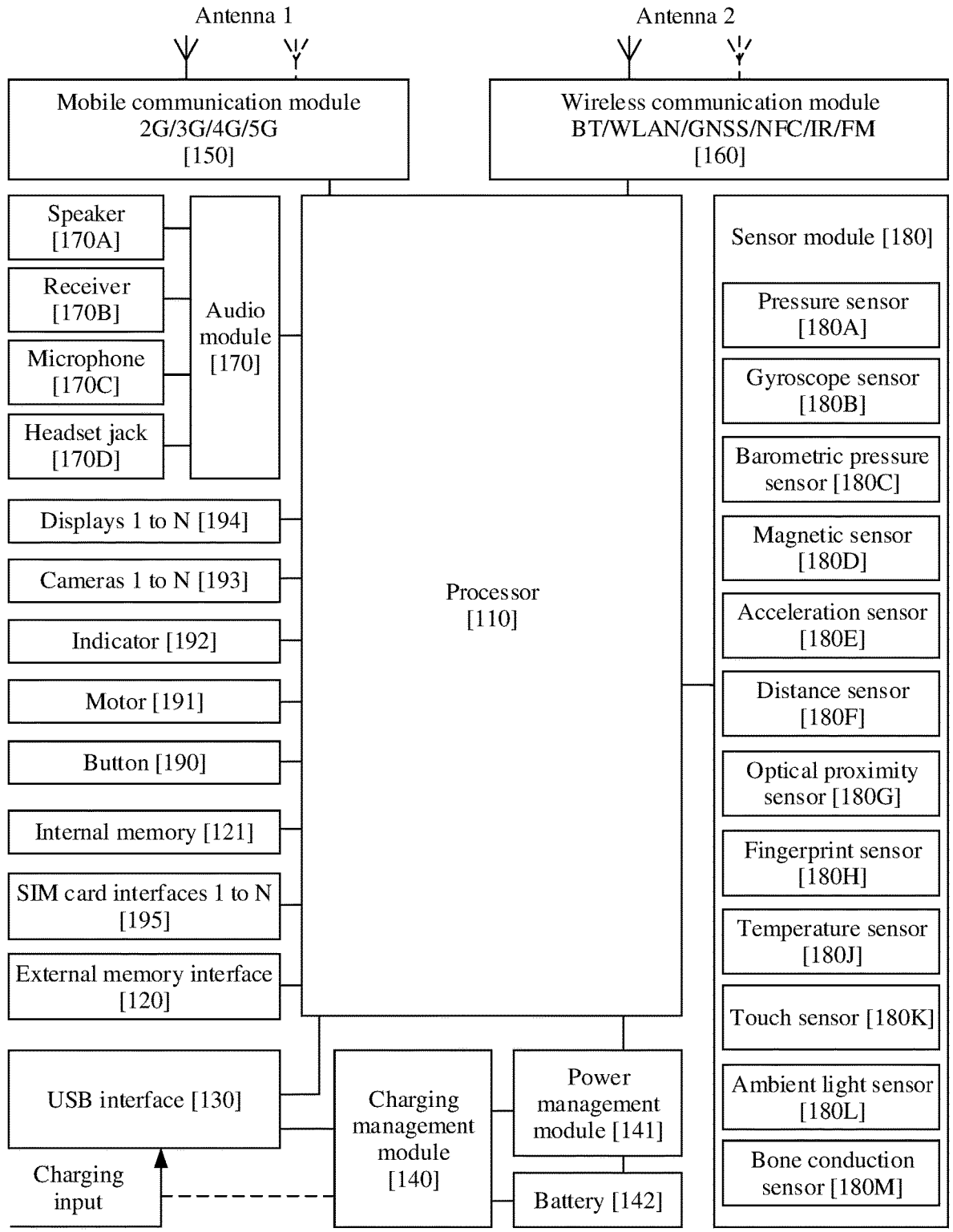
FIG. 3A is a schematic diagram of a structure of a mobile phone 100 according to some implementations of this application.

Refer to FIG. 3A. FIG. 3A is a schematic diagram of a structure of a mobile phone 100 as an example.

The mobile phone 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present disclosure does not constitute a specific limitation on the mobile phone 100. In some other embodiments of this application, the mobile phone 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be separate components, or may be integrated into one or more processors.

The processor may generate an operation control signal based on an instruction operation code and a time sequence signal, and complete control of instruction fetching and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor 110 may directly invoke the instructions or the data from the memory. In this way, repeated access is avoided, and waiting time of the processor 110 is reduced. This improves system efficiency.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, and a subscriber identity module (SIM) interface.

A wireless communication function of the mobile phone 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone 100 may be configured to cover one or more communication frequency bands. Different antennas may further be multiplexed, to improve antenna usage. For example, the antenna 1 may be multiplexed as a diversity antenna of a wireless local area network. In some other embodiments, the antenna may be used in combination with a tuning switch.

The mobile communication module 150 may provide a solution that is applied to the mobile phone 100 and that includes wireless communication such as 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing like filtering or amplification on the received electromagnetic wave, and transmit the electromagnetic wave to the modem processor for demodulation. The mobile communication module 150 may further amplify a signal modulated by the modem processor, and convert the signal into an electromagnetic wave through the antenna 1 for radiation. In some embodiments, at least some functional modules of the mobile communication module 150 may be disposed in the processor 110. In some embodiments, at least some functional modules of the mobile communication module 150 may be disposed in a same component as at least some modules of the processor 110.

The wireless communication module 160 may provide a solution that is applied to the mobile phone 100 and that includes wireless communication like a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communication module 160 may be one or more devices that integrate at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave through the antenna 2 for radiation.

In some embodiments and in the mobile phone 100, the antenna 1 is coupled to the mobile communication module 150, and the antenna 2 is coupled to the wireless communication module 160, so that the mobile phone 100 can communicate with another device through a network and a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile phone 100 implements a display function by using the GPU, the display 194, the application processor, and the like. The GPU is a microprocessor for image processing, and is connected to the display 194 and the application processor. The GPU is configured to perform mathematical and geometric calculations for graphics rendering. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the mobile phone 100 may include one or N displays 194, where N is a positive integer greater than 1.

The NPU is a neural-network (NN) computing processor. The NPU quickly processes input information by referring to a structure of a biological neural network, for example, a transmission mode between human brain neurons, and may further continuously perform self-learning. The NPU can implement applications such as intelligent cognition of the mobile phone 100. For example, image recognition, facial recognition, speech recognition, and text understanding.

The internal memory 121 may be configured to store computer-executable program code, where the executable program code includes instructions. The internal memory 121 may include a program storage area and a data storage area. The program storage area may store an operating system, an application required by at least one function (for example, a sound playing function and an image playing function), and the like. The data storage area may store data (like audio data and a phone book) created during use of the mobile phone 100. In addition, the internal memory 121 may include a high speed random access memory, and may further include a nonvolatile memory, for example, at least one magnetic disk storage device, a flash storage device, or a universal flash storage (UFS). The processor 110 executes various function applications and data processing of the mobile phone 100 by running the instructions stored in the internal memory 121 and/or the instructions stored in the memory disposed in the processor, for example, performing the file access method provided in this application.

The mobile phone 100 may implement an audio function by using the audio module 170, the speaker 170A, the receiver 170B, the microphone 170C, the headset jack 170D, the application processor, and the like. For example, playing music, and recording.

The pressure sensor 180A is configured to sense a pressure signal, and may convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, a capacitance between electrodes changes. The mobile phone 100 determines pressure intensity based on a capacitance change. When a touch operation is performed on the display 194, the mobile phone 100 detects intensity of the touch operation by using the pressure sensor 180A. The mobile phone 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The touch sensor 180K is also referred to as a "touch device". The touch sensor 180K may be disposed on the display 194. The touch sensor 180K and the display 194 constitute a touchscreen, which is also referred to as a "touch screen". The touch sensor 180K is configured to detect a touch operation performed on or near the touch sensor 180K. The touch sensor may transfer a detected touch operation to the application processor, to determine a touch event type. A visual output related to the touch operation may be provided on the display 194. In some other embodiments, the touch sensor 180K may be also disposed on a surface of the mobile phone 100 at a location different from a location of the display 194.

Figure 3B:
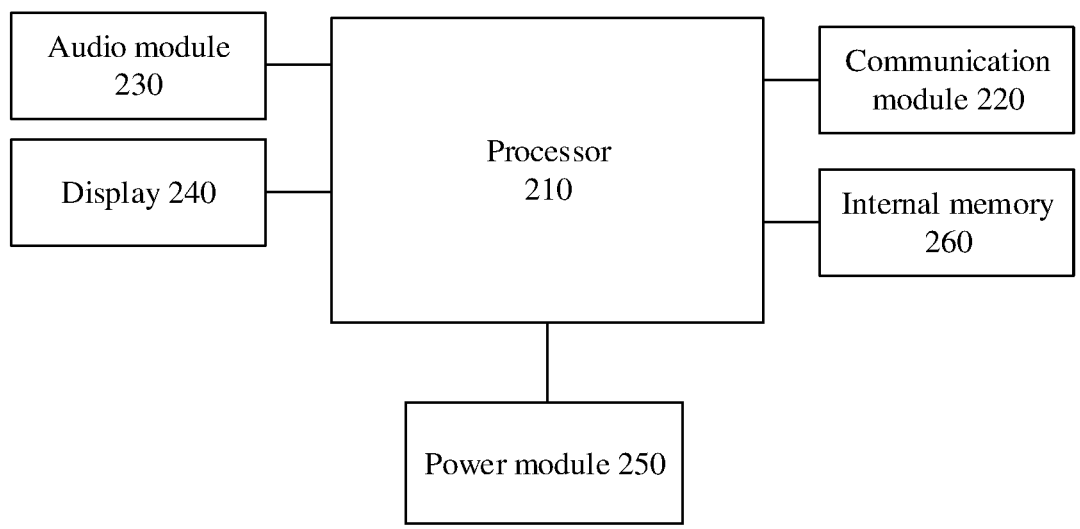
FIG. 3B is a schematic diagram of a structure of a PC 200 according to some implementations of this application.

Refer to FIG. 3B. FIG. 3B is a schematic diagram of a structure of a PC 200 as an example.

The PC 200 may include a processor 210, a communication module 220, an audio module 230, a display 240, a power module 250, and an internal memory 260.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and the like. Different processing units may be separate components, or may be integrated into one or more processors. The processor may generate an operation control signal based on an instruction operation code and a time sequence signal, and complete control of instruction fetching and instruction execution.

The memory may be further disposed in the processor 210, and is configured to store instructions and data. In some embodiments, the memory in the processor 210 is a cache memory. The memory may store instructions or data that has been used or cyclically used by the processor 210. If the processor 210 needs to use the instructions or the data again, the processor 210 may directly invoke the instructions or the data from the memory. In this way, repeated access is avoided, and waiting time of the processor 210 is reduced. This improves system efficiency.

The communication module 220 may provide a solution that is applied to the PC 200 and that includes wireless communication like a WLAN (Wi-Fi) and BT.

The PC 200 implements a display function by using the GPU, the display 240, the application processor, and the like. The GPU is a microprocessor for image processing, and is connected to the display 240 and the application processor. The GPU is configured to perform mathematical and geometric calculations for graphics rendering. The processor 210 may include one or more GPUs that execute program instructions to generate or change display information.

The PC 200 may implement an audio function by using the audio module 230, the application processor, and the like. For example, playing video and playing music.

The PC 200 may supply power to the PC 200 by using the power module 250.

The internal memory 260 may be configured to store computer-executable program code, where the executable program code includes instructions. The internal memory 260 may include a program storage area and a data storage area. The program storage area may store an operating system, an application required by at least one function (for example, a sound playing function and an image playing function), and the like. The data storage area may store data (like video data) created during use of the PC 200. In addition, the internal memory 260 may include a high speed random access memory, and may further include a nonvolatile memory, for example, at least one magnetic disk storage device, a flash storage device, or a universal flash memory (UFS). The processor 210 executes various function applications and data processing of the PC 200 by running the instructions stored in the internal memory 260 and/or the instructions stored in the memory disposed in the processor, for example, performing the file access method provided in this application.

It can be understood that the structure shown in the embodiment of this application does not constitute a specific limitation on the PC 200. In some other embodiments of this application, the PC 200 may include more or fewer components than those shown in the figure, or combine some components, or split some components, or have different component arrangements. The components shown in the figure may be implemented by using hardware, software, or a combination of software and hardware.

Figure 4A:
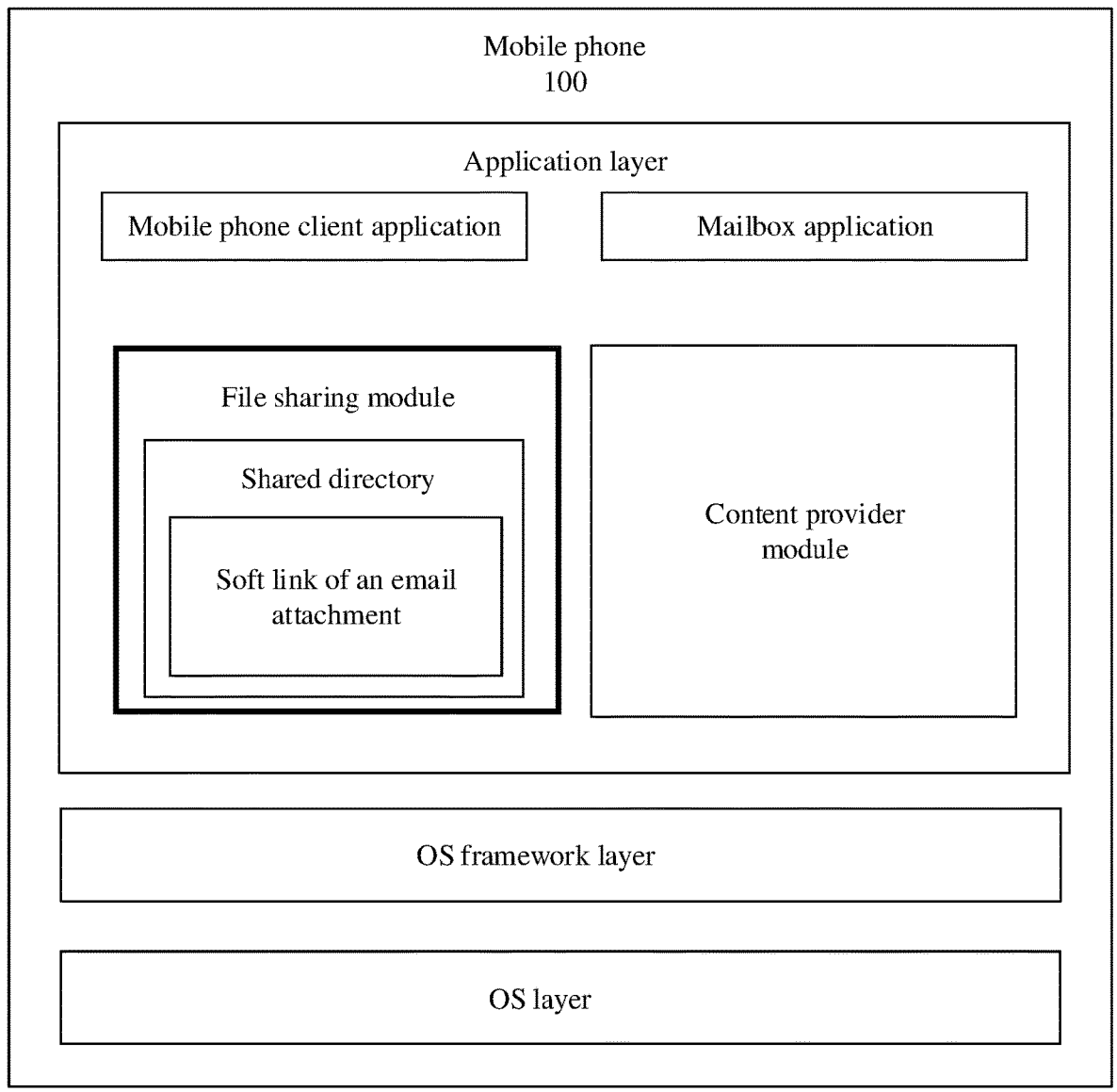
FIG. 4A is a schematic diagram of a structure of software of a mobile phone 100 according to some implementations of this application.

Refer to FIG. 4A. FIG. 4A is a block diagram of a software structure of a mobile phone 100 as an example.

The software structure of the mobile phone 100 may be an Android-based software structure, and includes an application layer, an operating system (OS) framework layer, and an OS layer. The application layer includes a mobile phone client application (the mobile phone client application is used as an example of a second collaborative application), a mailbox application (the mailbox application is used as an example of a target operation application), a file sharing module (the file sharing module is used as an example of a second file sharing module), and a content provider module (or may be referred to as a content provider component).

A function of the mobile phone client application is to implement a collaboration function between the PC 200 and the mobile phone 100 that establish a communication connection.

The mobile phone client application is further configured to interact with another application of the mobile phone 100 in a process in which the PC 200 performs collaboration on the mobile phone 100, for example, interact with a mailbox application that is of the mobile phone 100 and that is used as a target operation application requesting collaboration by the PC 200, to obtain a uniform resource identifier (URI) string of a sandbox file in the mailbox application.

A structure of the URI string is similar to that of a common URL. For example, an example of the URI string is as follows:

content://com.huawei.mail/my_images/IMG_0094.JPG, where

"content://" indicates a dedicated access protocol of the content provider module, the content provider module is a standard application programming interface (API) for data exchange between different applications, and the Content Provider module externally provides data in a URI string form and allows another application to access and modify data;

"com.huawei.mail" indicates a package name used to identify an application to which a file indicated by the URI string belongs, and "com.huawei.mail" indicates that the file indicated by the URI string belongs to the Huawei mailbox application;

"my_images" indicates a relative path of the file (which can be specifically a relative path in a package name directory); and "IMG_0094.JPG" indicates a file name, for example, a name of an email attachment, and "IMG_0094.JPG" can also be a file name like default_image.jpg.

The URI string is strictly configured according to the dedicated access protocol of the content provider module, and therefore can indicate a unique file in the entire mobile phone 100.

The mobile phone client application may further interact with the file sharing module in the mobile phone 100, to map the sandbox file in the mailbox application to a shared directory of the file sharing module in the mobile phone 100.

The file sharing module is a core of this application. The file sharing module is responsible for a basic operation on a file in the shared directory, and is responsible for interaction with the content provider module. Specifically, a soft link interface of the file sharing module in the mobile phone 100 is extended, so that the soft link interface of the file sharing module in the mobile phone 100 supports a soft link in a URI string form. In addition, the file sharing module in the mobile phone 100 may interact with the content provider module through an aidl (Android interface definition language) interface, to map an internal file of an application of the mobile phone 100 to the shared directory of the file sharing module. For example, the sandbox file in the mailbox application is mapped to the shared directory of the file sharing module. The sandbox file in the mailbox application is mapped to the shared directory of the file sharing module. For example, an internal file of the mailbox application may be used as an email attachment of the sandbox file to create a soft link, and the soft link of the email attachment is stored in the shared directory. The soft link includes location information of the mailbox application, and the location information may be the foregoing absolute path determined based on the URI. The file sharing module stores a correspondence between a path of the soft link and an fd in a data structure of the file sharing module in the mobile phone 100.

The file sharing module in the mobile phone 100 is further configured to share a shared directory of the file sharing module with a shared directory of a file sharing module in the PC 200, so that the PC 200 can view the shared directory of the file sharing module in the PC 200, that is, view the soft link of the email attachment. In addition, the file sharing module in the mobile phone 100 is further configured to share the correspondence between the path of the soft link and the fd in the file sharing module with the file sharing module in the PC 200.

In addition, the mobile phone client application may further send the path of the soft link to a PC client application of the PC 200. The PC client application of the PC 200 may determine a corresponding soft link and fd based on the path of the soft link, the soft link in the file sharing module in the PC 200, and the correspondence between the path of the soft link and the fd, and may access the email attachment based on the soft link and the fd.

The application layer of the mobile phone 100 may also include another application. In addition, the OS framework layer and the OS layer of the mobile phone 100 may include other functional modules. This is not described in this application.

Figure 4B:
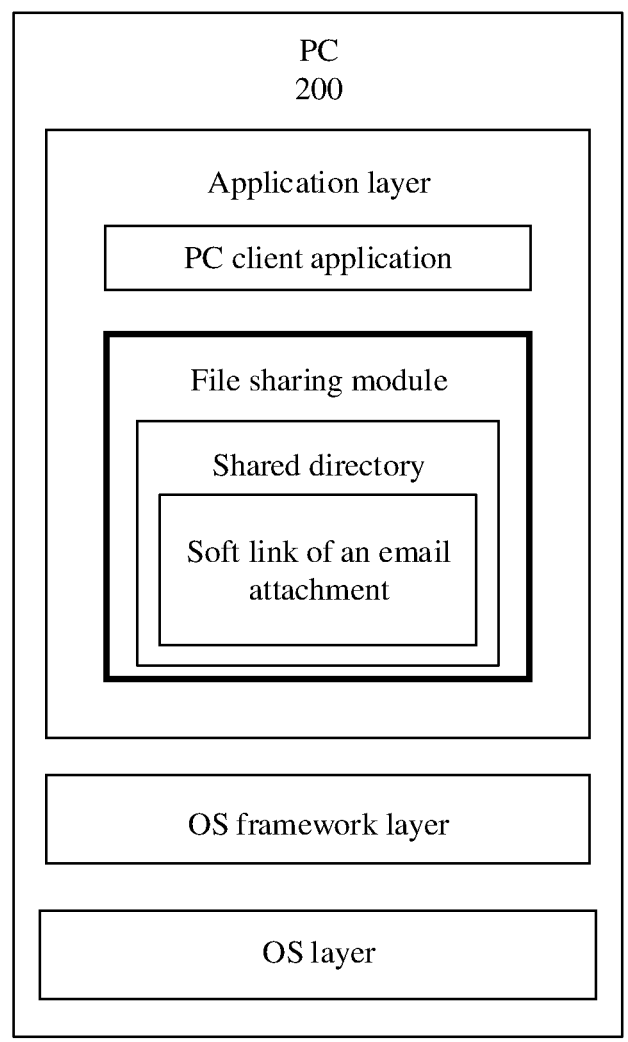
FIG. 4B is a schematic diagram of a structure of software of a PC 200 according to some implementations of this application.

Refer to FIG. 4B. FIG. 4B is a block diagram of a software structure of a PC 200 as an example.

The software structure of the PC 200 may be an Android-based software structure, and includes an application layer, an OS framework layer, and an OS layer. The application layer includes a PC client application (the PC client application is used as an example of a first collaborative application) and a file sharing module (the file sharing module is used as an example of a first file sharing module).

A function of the PC client application is to implement a collaboration function between the PC 200 and the mobile phone 100 that establish a communication connection.

The PC client application may further access a file in a shared directory of the file sharing module in the PC 200, that is, may access the foregoing soft link of the email attachment.

In addition, the PC client application receives the path that is of the soft link and that is sent by the mobile phone 100, may determine a corresponding soft link and fd based on the soft link shared by the file sharing module in the mobile phone 100 in the file sharing module in the PC 200 and the correspondence between the path of the soft link and the fd, and may access the email attachment based on the soft link and the fd.

The application layer of the PC 200 may also include another application. In addition, the OS framework layer and the OS layer of the PC 200 may include other functional modules. This is not described in this application.

In this application, the file sharing module is a core of this application, is responsible for a basic operation on a file in the shared directory, and is responsible for interaction with a content provider module. The file sharing modules are respectively created in the mobile phone 100 and the PC 200, and the file sharing modules in the mobile phone 100 and the PC 200 maintain one shared directory. That is, a name of the shared directory in different devices of the mobile phone 100 and the PC 200 is the same, and the file sharing module has a communication capability and a distribution capability. On two devices of the mobile phone 100 and the PC 200 where the file sharing module is deployed, content (including the foregoing soft link and correspondence between the path of the soft link and the fd) of file sharing modules in the different devices is synchronized, and a file (for example, the foregoing soft link) created in the shared directory of the mobile phone 100 device can be accessed by the PC 200 through a network, on the contrary, a file created in the PC 200 can also be accessed by the mobile phone 100.

The file sharing module supports a file sharing service. The file sharing service is generally presented in a form of a file system, supports a standard file access interface, and is generally classified into a kernel mode and a user mode. In this application, the file sharing module supports operations such as file creation, deletion, reading/writing, and creation of a soft link of a file. Because the file sharing module in this application needs to interact with an application of the device, it is more convenient to implement the interaction at a user layer (that is, the application layer).

In this application, the soft link created by the mobile phone 100 for the email attachment that the PC 200 requests to access is stored in the shared directory of the file sharing module in the mobile phone 100, that is, the email attachment is mapped to the shared directory, and the correspondence between the path of the soft link and the fd is stored in a data structure of the file sharing module. In addition, the mobile phone 100 shares the shared directory and the data structure of the file sharing module in the mobile phone 100 with the file sharing module in the PC 200. The PC 200 may obtain, from the shared directory of the file sharing module in the PC 200, a soft link corresponding to an email attachment of the mobile phone 100 that requests to access, and may link to the email attachment based on the soft link. In addition, the PC 200 may determine, based on the correspondence between the path of the soft link and the fd, the fd required for accessing the email attachment, so that the PC 200 accesses the email attachment.

In some other implementations of this application, the software structures of the mobile phone 100 and the PC 200 may also be structures in other forms.

In an implementation of this application, the mobile phone 100 establishes an NFC communication connection to the PC 200, and after the mobile phone 100 and the PC 200 enable a collaboration function between each other, the PC 200 may directly access a sandbox file in the mobile phone 100.

Figures 1, 5A:
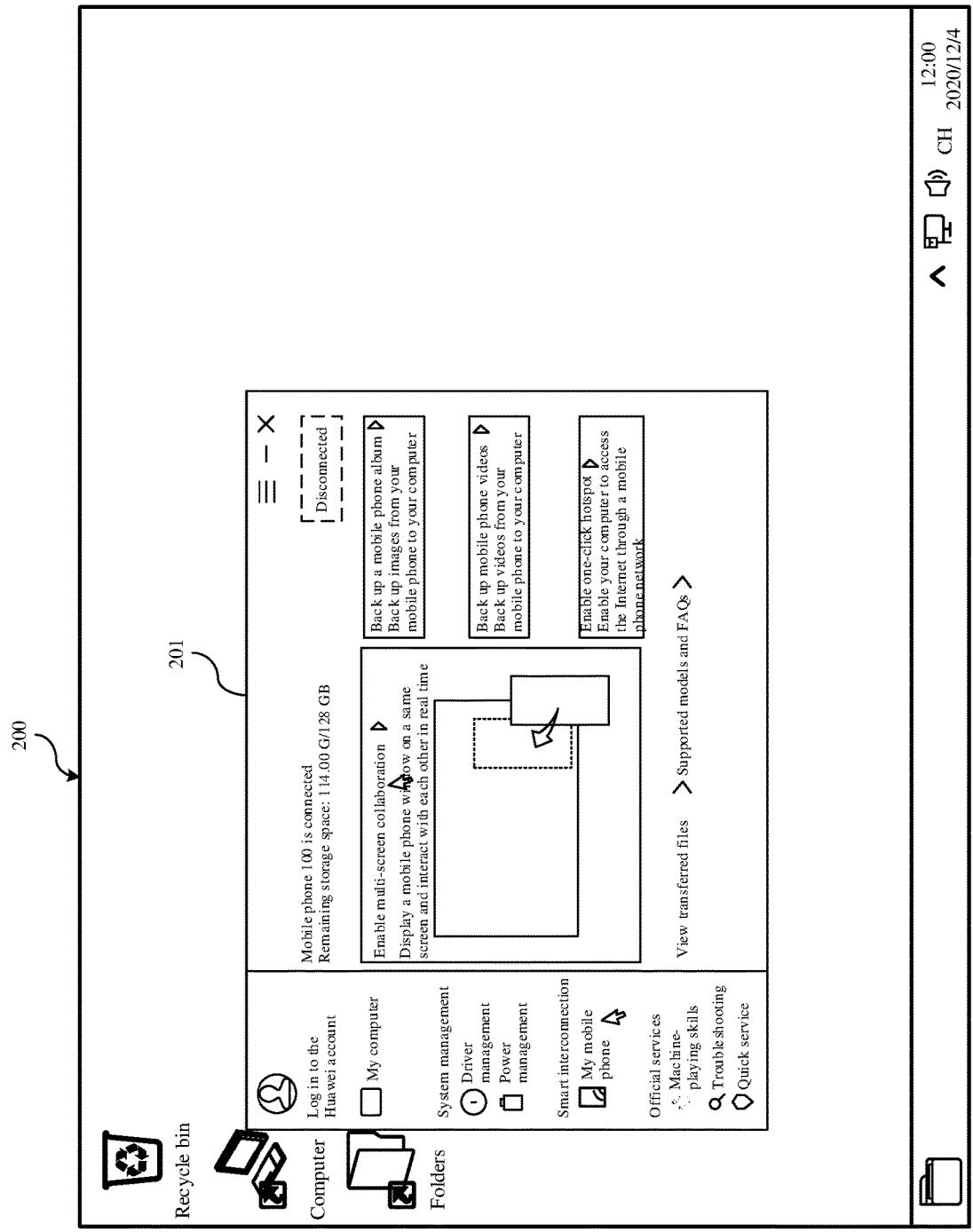
Figures 2, 5A:
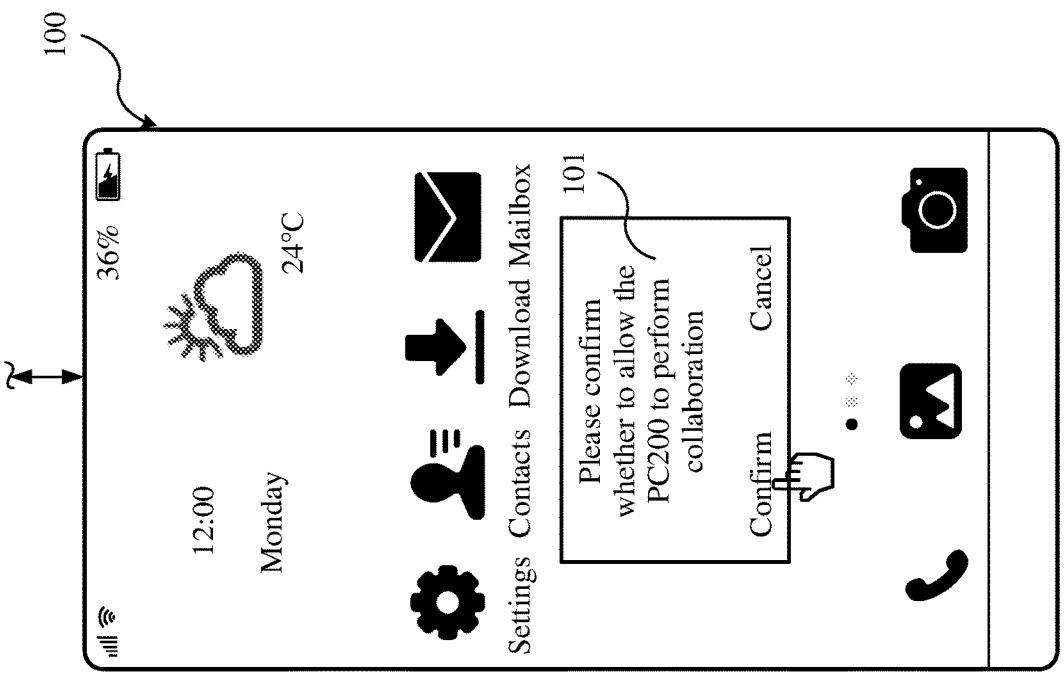

Refer to FIG. 5A-1 and FIG. 5A-2. In an implementation of this application, the mobile phone 100 establishes an NFC communication connection to the PC 200, a setting interface 201 may be displayed on a display interface of the PC 200, and the setting interface 201 includes an "Enable multi-screen collaboration" control. As shown in FIG. 5A-1 and FIG. if the PC 200 detects (or receives) a click operation performed by a user on the "Enable multi-screen collaboration" control, for example, the PC 200 detects that the user clicks the "Enable multi-screen collaboration" control by using a mouse, the PC 200 sends a collaboration request to the mobile phone 100.

After receiving the collaboration request sent by the PC 200, the mobile phone 100 displays a display interface shown in FIG. 5A-1 and FIG. 5A-2. The display interface includes reminder information 101 "Please confirm whether to allow the PC 200 to perform collaboration". If the mobile phone 100 detects a tap operation performed by the user on a "Confirm" control, the mobile phone 100 sends, to the PC 200, response information indicating that collaboration is agreed. After the PC 200 receives the response information, the PC 200 and the mobile phone 100 enable a collaboration function between each other. The PC 200 updates the setting interface 201, and displays an updated setting interface 202 shown in FIG. and FIG. 5B-2. It can be seen from the setting interface 202 that the PC 200 and the mobile phone 100 have enabled a collaboration function between each other, and the PC 200 may perform a collaboration operation on the mobile phone 100.

Figures 1, 5B:
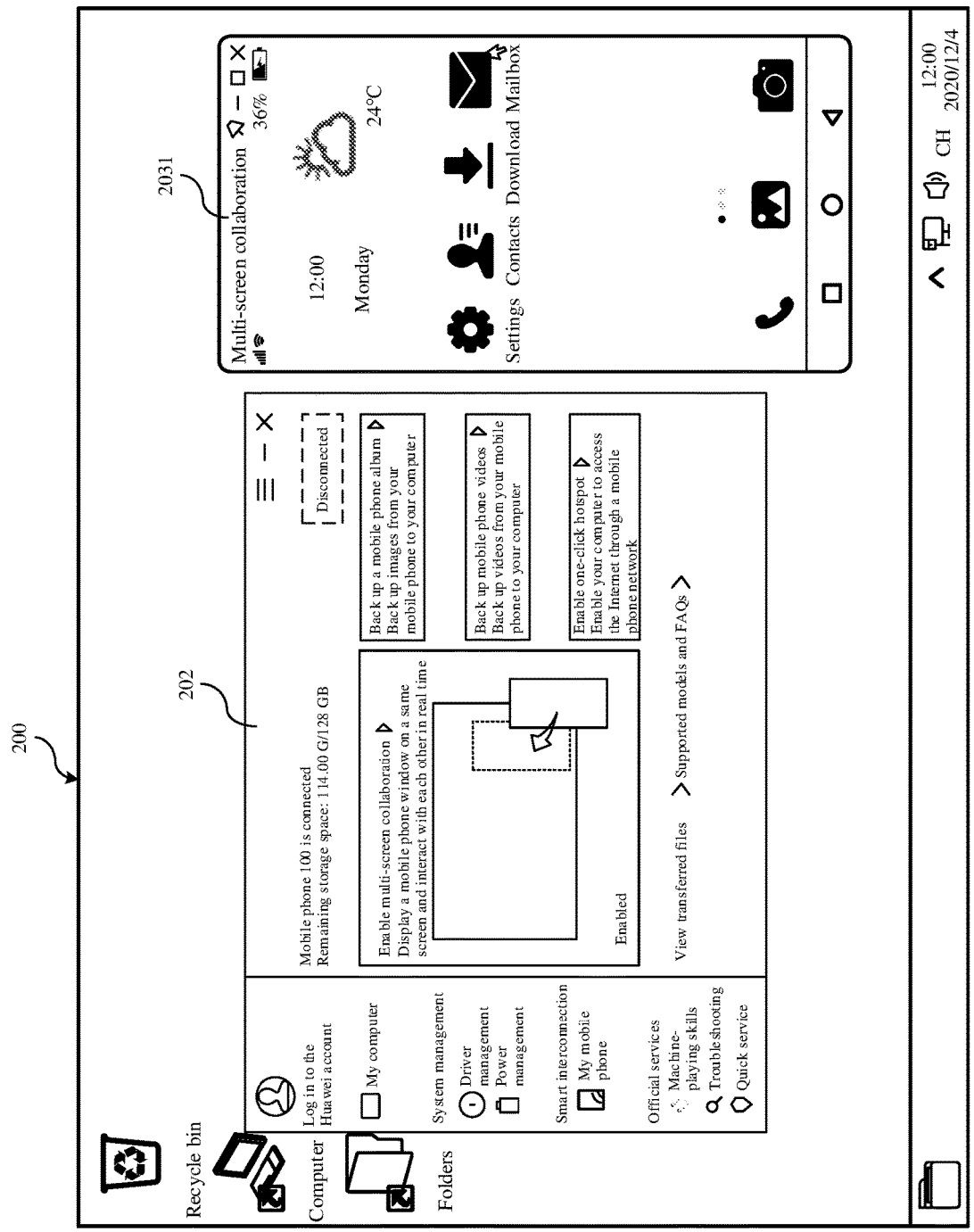

Still refer to FIG. 5B-1 and FIG. 5B-2. After the PC 200 and the mobile phone 100 enable the collaboration function between each other, the mobile phone 100 sends, to the PC 200, a display interface (for example, a home screen of the mobile phone 100 displayed by the mobile phone 100) displayed by the mobile phone 100 as a first shared interface. The PC 200 receives the first shared interface sent by the mobile phone 100, and displays, on the display interface of the PC 200 as a shared interface, a second shared interface 2031 that corresponds to the first shared interface and that is shown in FIG. 5B-1 and FIG. 5B-2. The user may perform a collaboration operation on the mobile phone 100 by operating the second shared interface 2031 displayed on the PC 200.

In this implementation, the second shared interface may be partially the same as the first shared interface. For example, compared with the first shared interface displayed by the mobile phone 100, the second shared interface 2031 further includes prompt information like "Multi-screen collaboration" on the top, or an interface display proportion of the second shared interface 2031 is different from that of the first shared interface displayed by the mobile phone 100.

Certainly, in some other implementations of this application, the second shared interface may also be completely the same as the first shared interface.

Still refer to FIG. 5B-1 and FIG. 5B-2. In an implementation of this application, the second shared interface 2031 includes an icon and an application name that correspond to a mailbox application of the mobile phone 100. If the PC 200 detects a click operation performed by the user on the icon or the application name of the mailbox application, the PC 200 opens the mailbox application, and displays a mailbox application interface 2032 shown in FIG. 5C-1 and FIG. 5C-2. The mailbox application interface 2032 includes a plurality of emails corresponding to an inbox, for example, an email from "xxxxxx.@163.com" and an email from "Zhang San" and "Xiao Wang". The mailbox application interface 2032 further includes receiving time of each email, and information and controls such as Write an email, Search, and More.

Figures 1, 5C:
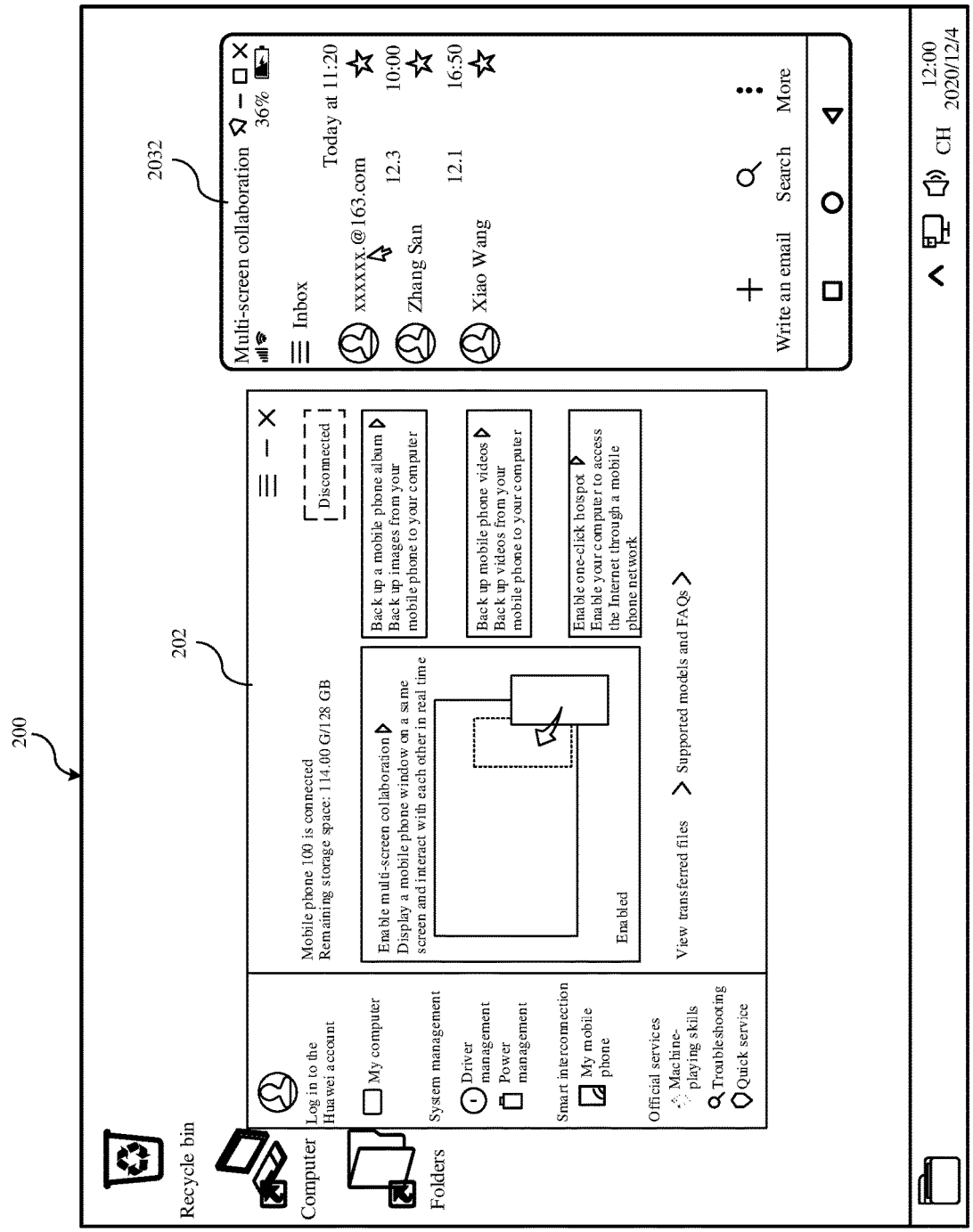
Figures 2, 5C:
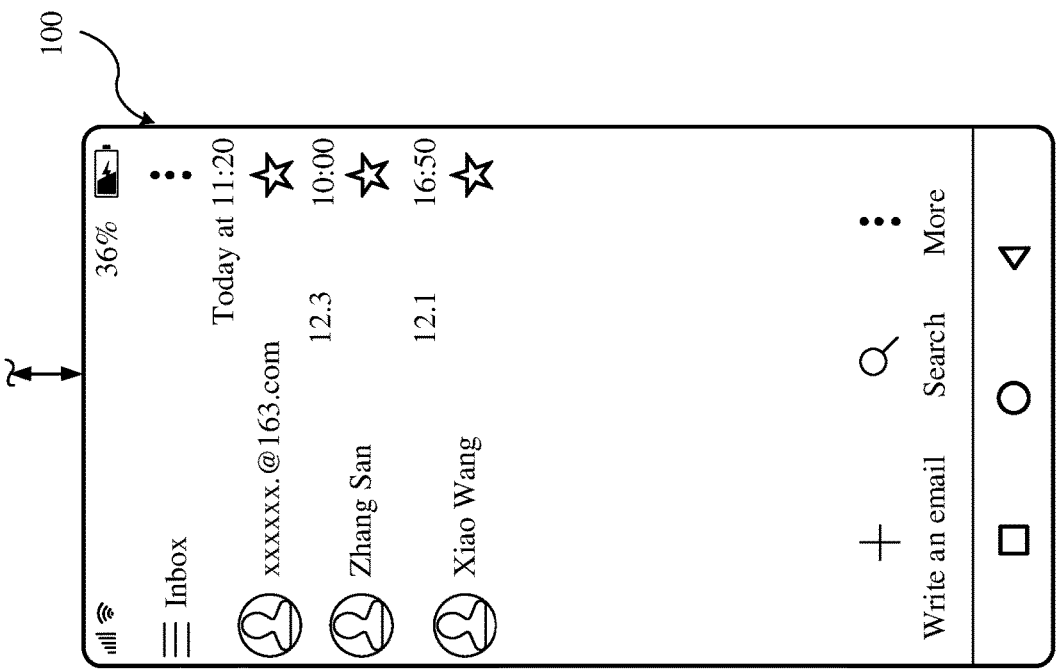
Figures 1, 5D:
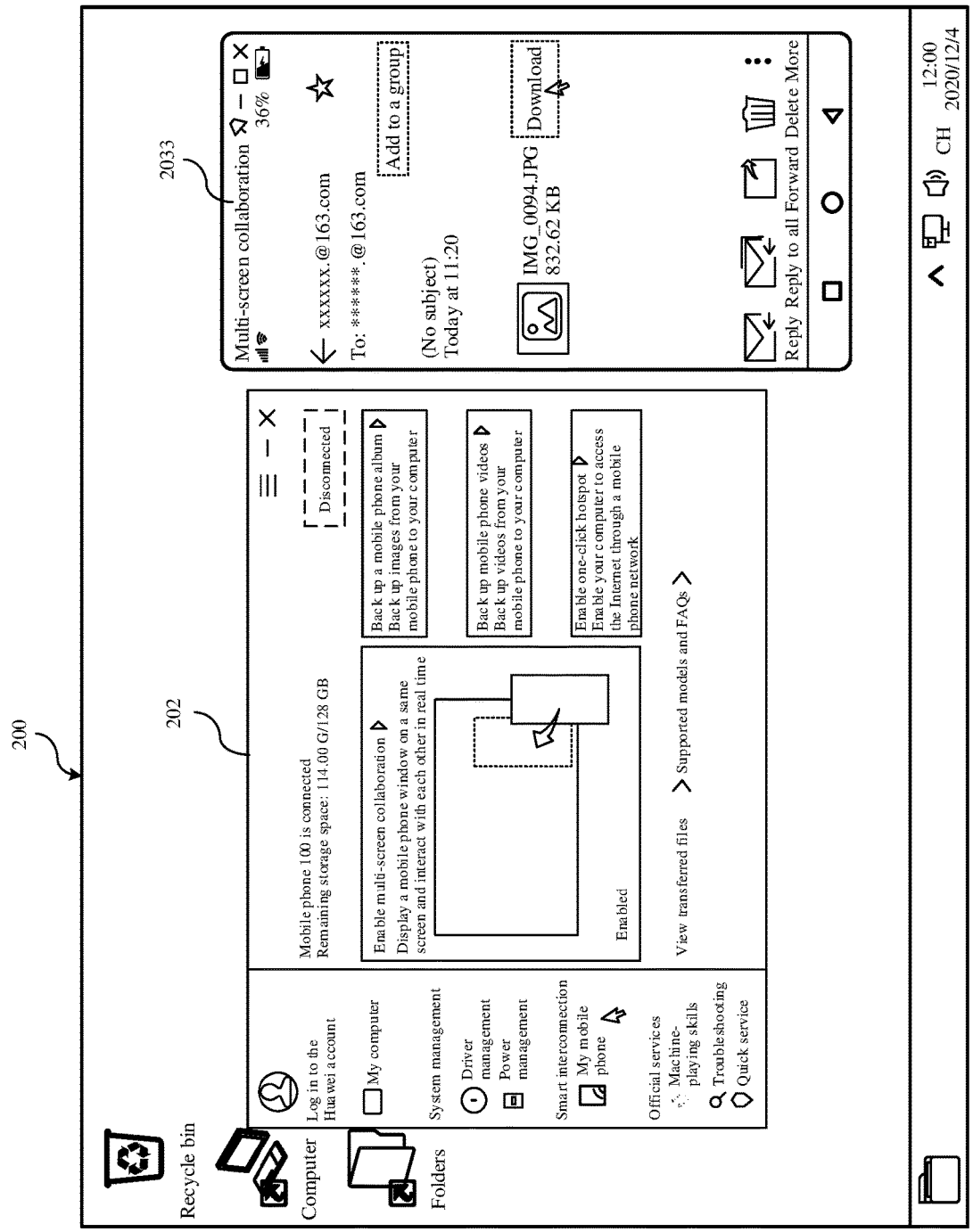

Still refer to FIG. 5C-1 and FIG. 5C-2. If the PC 200 detects a click operation performed by the user on the email from "xxxxxx.@163.com" in the mailbox application interface 2032, the PC 200 displays an email display interface 2033 shown in FIG. 5D-1 and FIG. 5D-2. The email display interface 2033 includes sender information "xxxxxx.@163.com", recipient information "******.@163.com", and an image file "IMG_0094.JPG" used as an email attachment (the email attachment may also be referred to as an email attachment file). In addition, the email display interface 2033 further includes a "Download" control corresponding to the email attachment.

Figures 1, 5E:
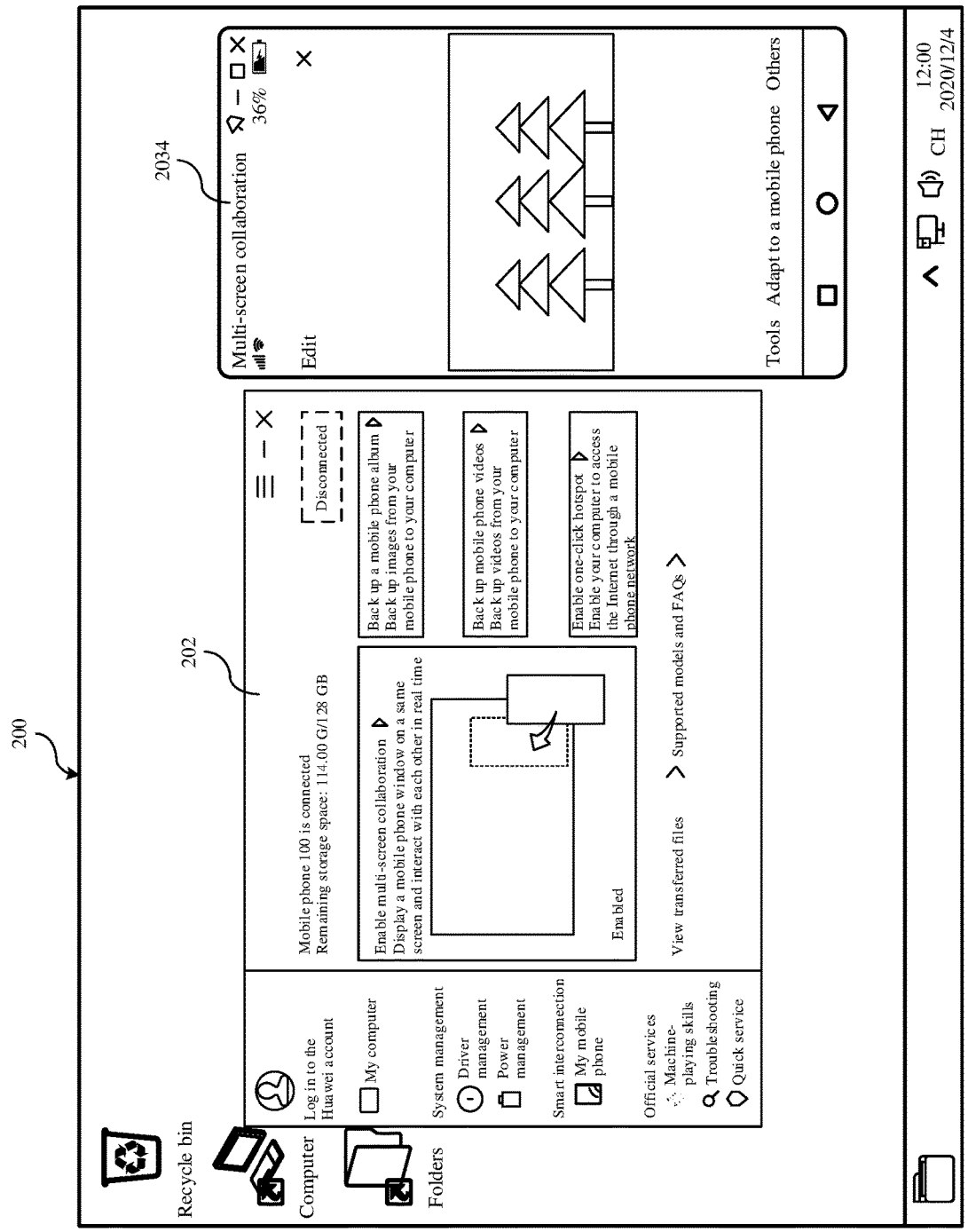

If the PC 200 detects a click operation (the click operation is used as an example of a trigger operation) performed by the user on the "Download" control corresponding to the image file "IMG_0094.JPG" used as an email attachment, the PC 200 sends an access request to the mobile phone 100. The access request includes access action information that the user clicks a mouse and that corresponds to the click operation performed by the user on the "Download" control and coordinate information of a location at which the user performs the click operation on the shared interface. The PC 200 requests, from the mobile phone 100 by using the access request, to obtain the soft link corresponding to the email attachment, the path of the soft link, and the correspondence between the path of the soft link and the fd. Then, the PC 200 first determines, based on the obtained path that is of the soft link corresponding to the email attachment and that is sent by the mobile phone 100, the soft link and the fd that correspond to the path of the soft link, and then the PC 200 may directly access the email attachment based on the soft link and the fd. For example, the PC 200 may directly download the email attachment. After downloading the email attachment, the PC 200 may display a display interface shown in FIG. 5E-1 and FIG. 5E-2, that is, the PC 200 directly opens the successfully downloaded image file "IMG_0094.JPG" used as the email attachment.

According to the file access method provided in this implementation, the PC 200 may directly access the email attachment in the mailbox application of the mobile phone 100 based on the path that is of the soft link and that is sent by the mobile phone 100, the soft link, and the correspondence between the path of the soft link and the fd. This can effectively improve effects of a collaboration operation and interaction performed by the PC 200 on the mobile phone 100, and improve user experience.

Figure 6:
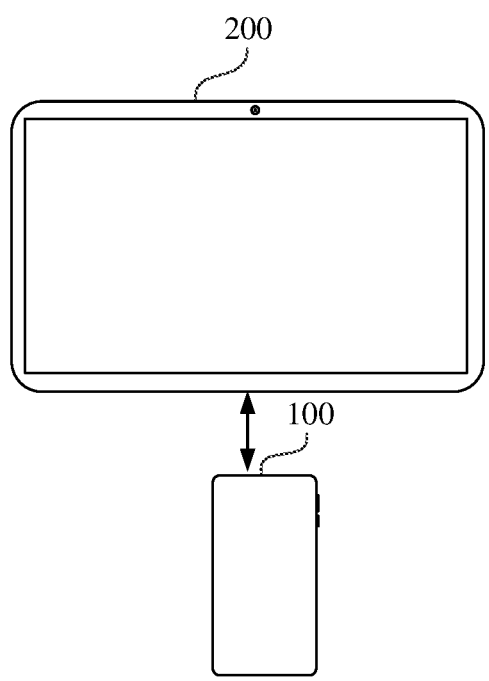
FIG. 6 is a schematic diagram of another communication system provided in this application according to some implementations of this application.

Refer to FIG. 6. In another implementation of this application, a tablet computer is used as an example of the PC 200, and the PC 200 establishes the NFC communication connection to the mobile phone 100, and enables a collaboration function between the PC 200 and the mobile phone 100.

Figures 1, 7A:
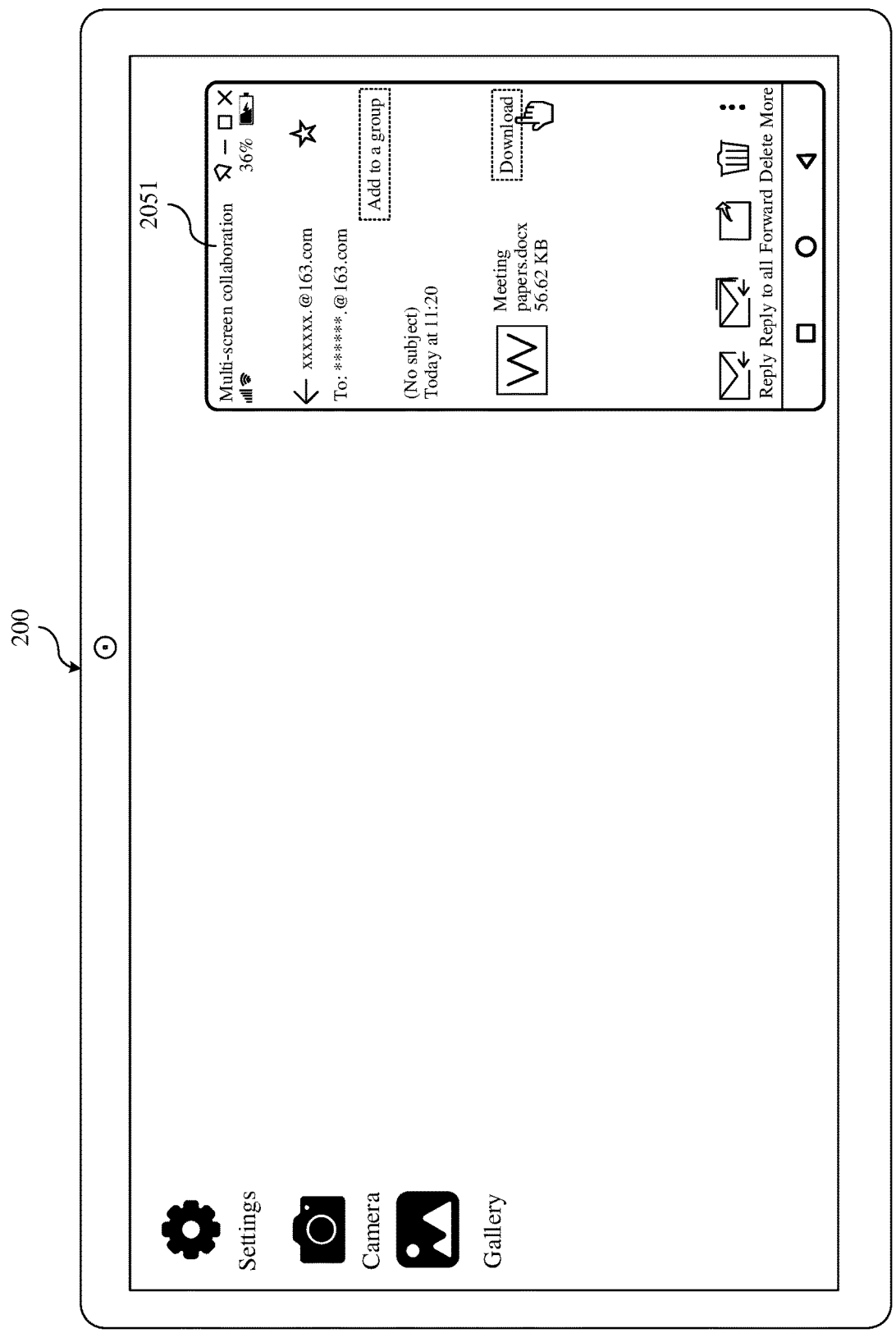
Figures 1, 7B:
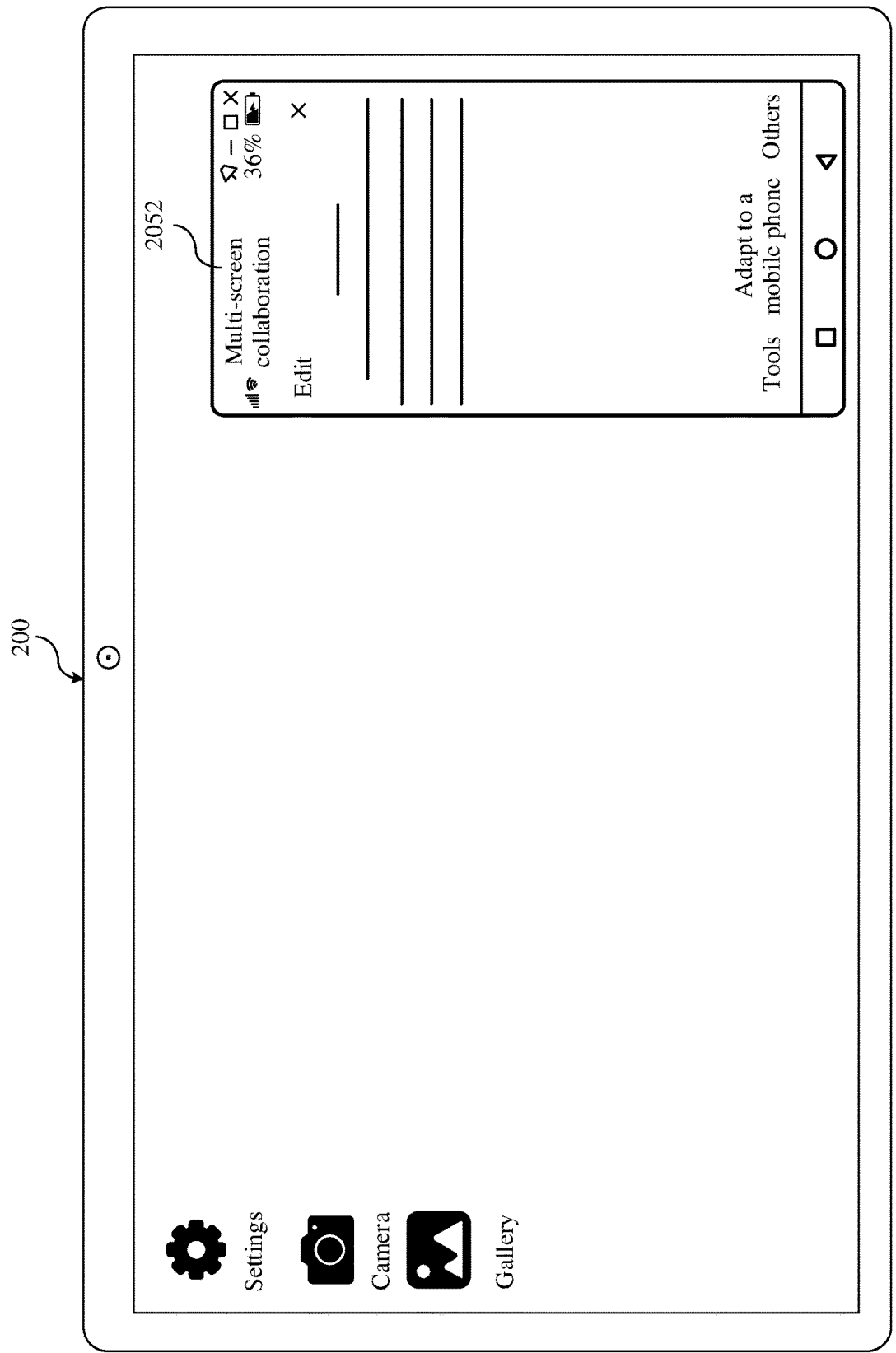
Figures 2, 7B:
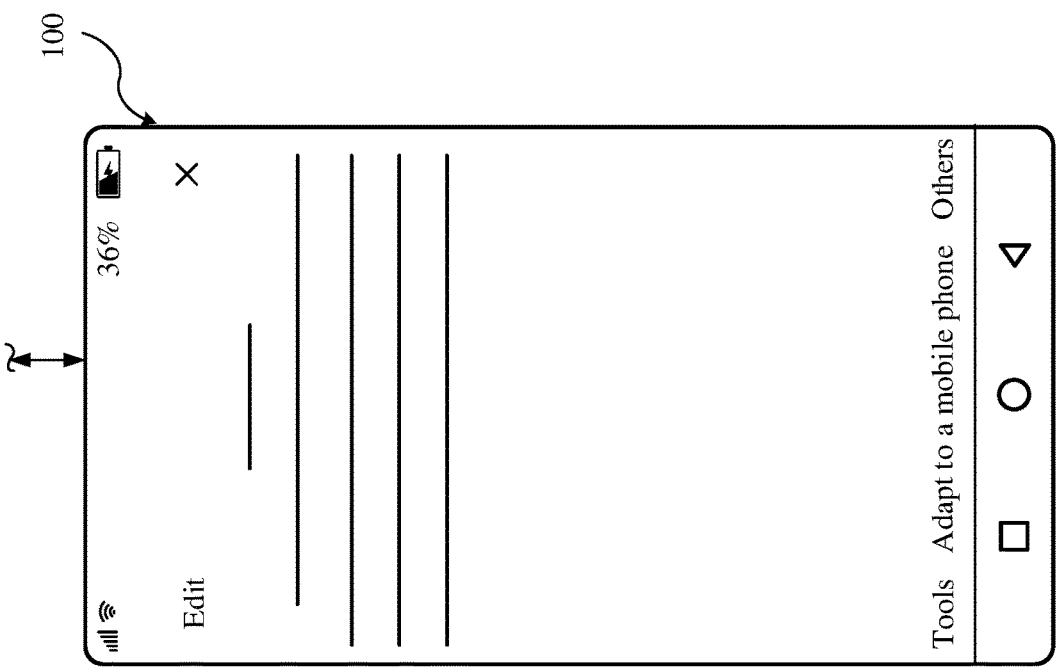

Refer to FIG. 7A-1 and FIG. 7A-2. In another implementation of this application, the PC 200 enables a collaboration function for the mobile phone 100, and the PC 200 displays an email display interface 2051 corresponding to a mailbox application. An email attachment included in the email display interface 2051 is a document file "Conference file.docx", and the email display interface 2051 includes a "Download" control corresponding to the email attachment. If the PC 200 detects a click operation performed by a user on the "Download" control, the PC 200 determines that a trigger operation performed by the user on the email attachment is received, and the PC 200 sends an access request to the mobile phone 100 to obtain a soft link corresponding to the email attachment, a path of the soft link, and a correspondence between the path of the soft link and an fd. Then, the PC 200 downloads the email attachment based on the soft link, the path of the soft link, and the correspondence between the path of the soft link and the fd. After downloading the email attachment, the PC 200 may directly open the successfully downloaded email attachment, and display a document display interface 2052 shown in FIG. 7B-1 and FIG. 7B-2.

In another implementation of this application, the user may perform an operation like editing on the document file by using the PC 200. For example, if the PC 200 detects a double-click operation performed by the user on the document display interface 2052, the PC 200 displays a document editing interface 2053 shown in FIG. 7C-1 and FIG. 7C-2, and the user may edit the document file. In addition, if the PC 200 detects a click operation performed by the user on a "Done" control, the PC 200 saves the edited document file.

In this application, the document file may be a document file in a format like Word, PPT, or TXT, or certainly, may be a document file of another type.

According to the file access method provided in this implementation, the PC 200 may directly access the email attachment in the mailbox application of the mobile phone 100 based on the path that is of the soft link and that is sent by the mobile phone 100, the soft link, and the correspondence between the path of the soft link and the fd. This can effectively improve effects of a collaboration operation and interaction performed by the PC 200 on the mobile phone 100, and improve user experience.

In this application, the PC 200 may also be a notebook computer, a small notebook computer, an Ultrabook, or the like. A manner of implementing sandbox file access with the mobile phone 100 is the same as the foregoing, and details are not described herein again.

In an implementation of this application, after the mobile phone 100 and the PC 200 establish an NFC communication connection, the mobile phone 100 and the PC 200 may enable a collaboration function between each other, and share data like the shared directory of the file sharing module, so that the PC 200 can directly operate a sandbox file in the mobile phone 100.

Figure 8:
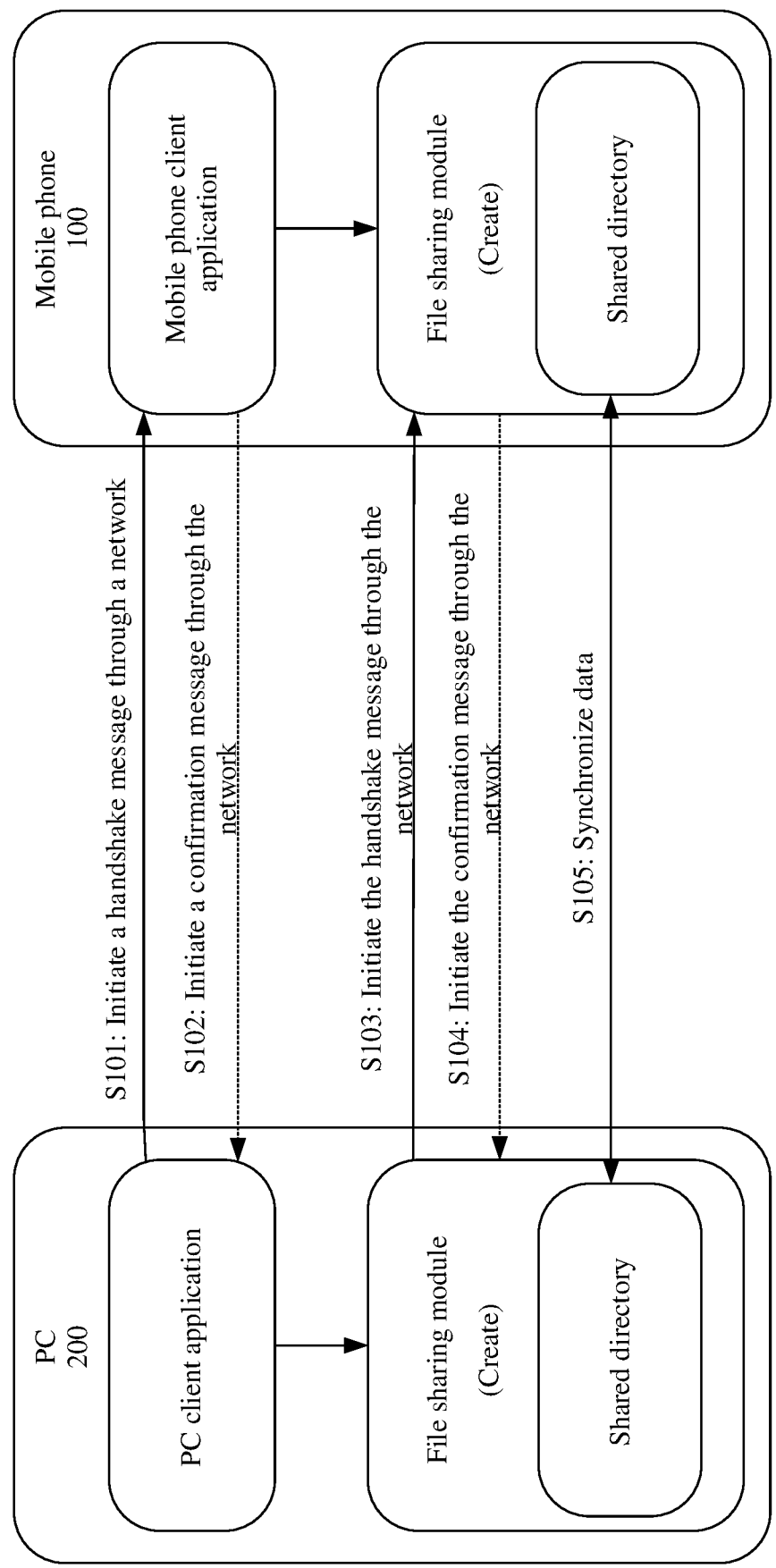
FIG. 8 is a schematic flowchart of establishing a communication connection and sharing a shared directory between a mobile phone 100 and a PC 200 in a file access method provided in this application according to some implementations of this application.

Refer to FIG. 8. In an implementation of this application, a process in which the mobile phone 100 and the PC 200 enable a collaboration function between each other and share data like a shared directory includes the following steps.

S101: APC client application of the PC 200 initiates (sends) a handshake message to a mobile phone client application of the mobile phone 100 through an NFC communication network between the PC 200 and the mobile phone 100. The handshake message is a request for enabling a collaboration function between the PC 200 and the mobile phone 100.

S102: After receiving the handshake message sent by the PC client application of the PC 200, the mobile phone client application of the mobile phone 100 initiates (sends) a confirmation message to the PC client application of the PC 200 through the NFC communication network, that is, the mobile phone 100 sends, to the PC 200, a message for confirming that the collaboration function between the PC 200 and the mobile phone 100 is enabled.

After receiving the confirmation message, the PC client application of the PC 200 and the mobile phone client application of the mobile phone 100 enable the collaboration function between the PC 200 and the mobile phone 100.

Further, in an implementation of this application, after the mobile phone 100 and the PC 200 enable the collaboration function between each other, the PC 200 displays a shared interface that is of the mobile phone 100 and that is shared by a mobile phone client application of the mobile phone 100 shown in FIG. 7A-1 and FIG. 7A-2, and the PC 200 may collaboratively operate the mobile phone 100 by using the shared interface. In addition, the PC client application of the PC 200 and the mobile phone client application of the mobile phone 100 start respective file sharing modules to share data like the shared directory. A process in which the file sharing module in the PC 200 and the file sharing module in the mobile phone 100 share data like the shared directory includes the following steps.

S103: The file sharing module in the PC 200 initiates (sends) the handshake message to the file sharing module in the mobile phone 100 through the NFC communication network between the PC 200 and the mobile phone 100. For example, after receiving a sandbox file access request sent by the PC client application, the mobile phone client application notifies the file sharing module in the PC 200 to initiate the handshake message to the file sharing module in the mobile phone 100. A process in which the mobile phone client application receives the sandbox file access request sent by the PC client application is described below.

S104: After receiving the handshake message sent by the file sharing module in the PC 200, the file sharing module in the mobile phone 100 sends the confirmation message to the file sharing module in the PC 200 through the NFC communication network between the PC 200 and the mobile phone 100.

S105: After the file sharing module in the PC 200 receives the confirmation message sent by the file sharing module in the mobile phone 100, the file sharing module in the PC 200 and the file sharing module in the mobile phone 100 start, the file sharing module in the PC 200 and the file sharing module in the mobile phone 100 establish a connection, and sharing of data like the shared directory is enabled between the file sharing module in the PC 200 and the file sharing module in the mobile phone 100. For example, the file sharing module in the mobile phone 100 shares the shared directory of the file sharing module with the file sharing module in the PC 200, and the file sharing module in the PC 200 shares the shared directory of the file sharing module with the file sharing module in the mobile phone 100, to implement bidirectional sharing of the shared directory between the PC 200 and the mobile phone 100.

In addition, the file sharing module in the mobile phone 100 may further share a data structure of the file sharing module with the file sharing module in the PC 200, and the file sharing module in the PC 200 may further share a data structure of the file sharing module with the file sharing module in the mobile phone 100.

In another implementation of this application, the mobile phone 100 may also share data like the shared directory of the file sharing module in the mobile phone 100 with the PC 200 in real time, so that the PC 200 can obtain the data like the shared directory of the file sharing module in the mobile phone 100, to access a sandbox file in the mobile phone 100, so as to implement unidirectional sharing of data like the shared directory between the PC 200 and the mobile phone 100.

In another implementation of this application, for S101, the mobile phone client application of the mobile phone 100 may initiate the handshake message to the PC client application of the PC 200 through the NFC communication network between the mobile phone 100 and the PC 200. For S102, it may also be that after receiving the handshake message sent by the mobile phone client application of the mobile phone 100, the PC client application of the PC 200 initiates the confirmation message to the mobile phone client application of the mobile phone 100 through the NFC communication network, to enable the collaboration function between the PC 200 and the mobile phone 100.

In another implementation of this application, for S103 and S104, the file sharing module in the PC 200 may initiate the handshake message, and the mobile phone client application of the mobile phone 100 replies the confirmation message. Details are not described herein again.

In an implementation of this application, after the collaboration function between the PC 200 and the mobile phone 100 is enabled, a shared interface sent by the mobile phone 100 may be seen in the PC 200, and the PC 200 may enter a mailbox application of the mobile phone 100 by using the shared interface sent by the mobile phone 100, and open an email attachment in the mailbox application. As shown in FIG. 7A-1 and FIG. 7A-2, the email attachment in the mailbox application includes a document attachment, and the user may enable the PC 200 to access the email attachment by clicking the email attachment. In this application, the PC 200 may directly perform operations such as downloading and opening on the email attachment in the mailbox application of the mobile phone 100.

Figure 9:
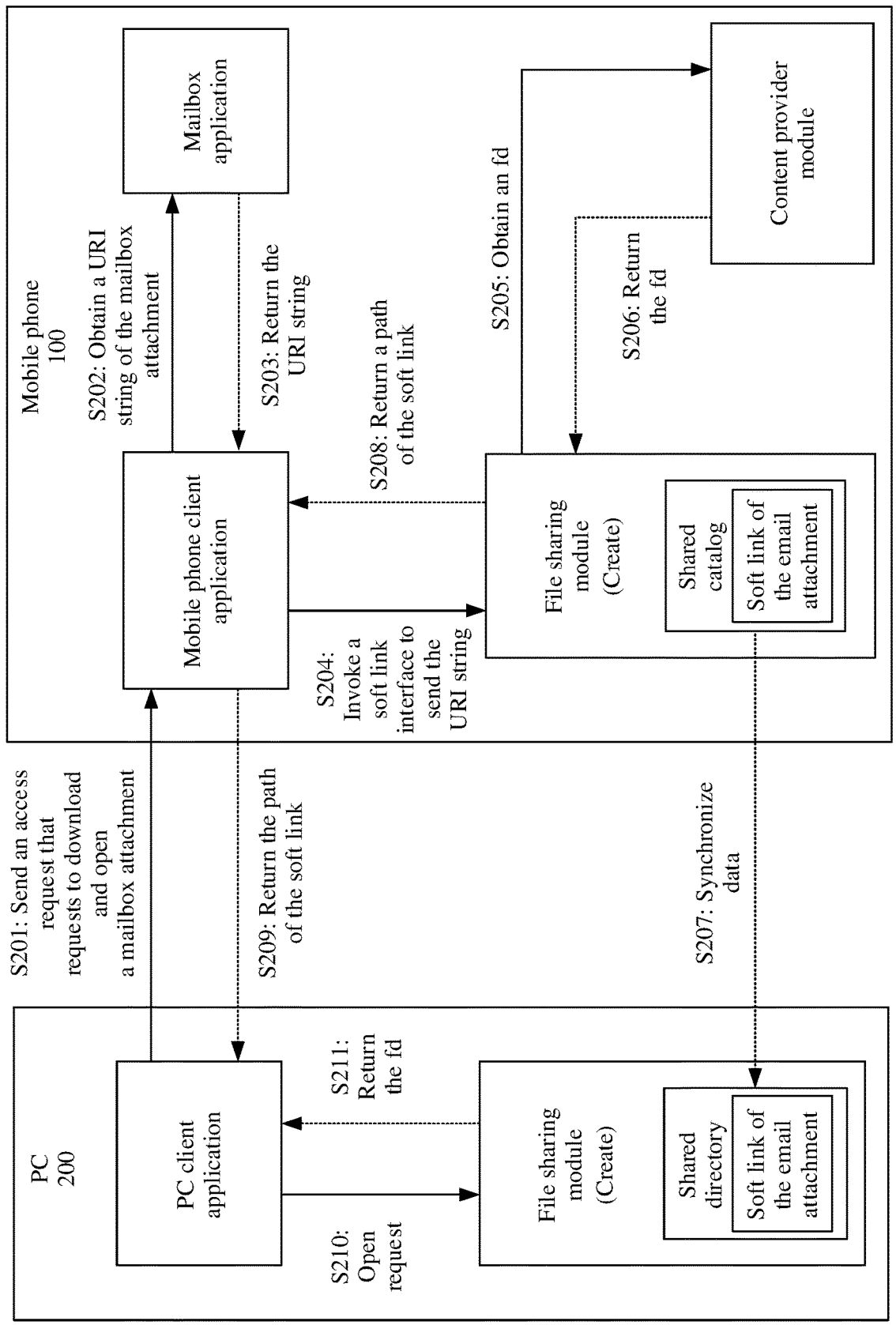
FIG. 9 is a schematic flowchart of accessing a sandbox file in a mobile phone 100 by a PC 200 in a file access method provided in this application according to some implementations of this application.

Refer to FIG. 9. In an implementation of this application, that the PC 200 directly performs an operation on the email attachment in the mobile phone 100 includes the following steps.

S201: The PC 200 displays the email display interface 2051 shown in FIG. 7A-1 and FIG. 7A-2. If a PC client application of the PC 200 detects the click operation (the click operation is used as an example of a trigger operation) performed in FIG. 7A-1 and FIG. 7A-2, in the email display interface 2051 corresponding to the mobile phone client application, by a user on the "Download" control corresponding to the email attachment in the mailbox application, the PC client application of the PC 200 sends an access request to the mobile phone client application of the mobile phone 100 through a communication channel corresponding to an NFC communication connection established between the PC 200 and the mobile phone 100, to request to download and open the email attachment.

The PC client application sends the access request to the mobile phone client application. The access request contains operation type information and operation area information corresponding to the triggered operation. The operation type information is access action information that the user clicks the "Download" control, and the operation area information is coordinate information of a location at which the user clicks the "Download" control on the shared interface and that is detected by the PC client application.

S202: The mobile phone client application receives the access request, and identifies, by parsing the received access request, the email attachment that the PC 200 needs to download and open. The mobile phone client application invokes an internal interface to initiate a URI obtaining request to the mailbox application to obtain a URI string corresponding to the email attachment. The URI obtaining request includes identification information of an email attachment. The identification information may be, for example, information like a URI: mail@mail.com, and is used to identify an operation of downloading and opening an email attachment by the PC 200.

S203: The mailbox application receives the URI obtaining request, determines the email attachment based on the URI obtaining request, and sends the URI string corresponding to the email attachment to the mobile phone client application.

Because the mobile phone client application is in a trust list of the mailbox application, after the mailbox application authorizes the mobile phone client application, the mailbox application sends the URI string corresponding to the email attachment to the mobile phone client application, so that the mobile phone client application can normally obtain the URI string.

After obtaining the URI string, the mobile phone client application uses the URI string as a source path and invokes a soft link interface to map a file indicated by the URI string to a shared directory maintained by a file sharing module, to generate a soft link. That the mobile phone client invokes the soft link interface to create a soft link includes the following.

S204: After obtaining the URI string, the mobile phone client application uses the URI string as the source path, invokes the soft link interface of the file sharing module in the mobile phone 100, to send the URI string to the file sharing module in the mobile phone 100.

The soft link interface may be, for example, a symlink interface.

S205: The file sharing module in the mobile phone 100 invokes an aidl interface provided by a content provider module externally, and sends an fd obtaining request to the content provider module, to obtain an fd of the email attachment indicated by the URI. The fd obtaining request includes the URI string.

S206: The content provider includes correspondences between URI strings and fds that are of various files in the mobile phone 100. After receiving a third request, the content provider determines, based on the fd obtaining request, the fd of the email attachment indicated by the URI string included in the fd obtaining request, and sends the fd to the file sharing module in the mobile phone 100, to return the fd to the file sharing module in the mobile phone 100. The fd is a non-negative integer, for example, 1.

Then, the file sharing module in the mobile phone 100 creates a soft link in the shared directory of the file sharing module, and organizes a path of the soft link and the fd into a correspondence and stores the correspondence in a data structure of the file sharing module.

The soft link refers to a file created in the shared directory, and the path of the soft link refers to a path of the file. The file points to another file entity. When the file is opened, a file that the file points to is actually opened, for example, may be a shortcut.

S207: The file sharing module in the mobile phone 100 synchronizes (sends) the soft link of the email attachment in the shared directory of the file sharing module to the shared directory of the sharing module in the PC 200 through the communication channel between the mobile phone 100 and the PC 20, and synchronizes the data structure of the file sharing module in the mobile phone 100 to a data structure of the sharing module in the PC 200, to implement sharing and synchronization of data like the soft link and the correspondence between the path of the soft link and the fd.

S208: The mobile phone 100 sends the path of the soft link corresponding to the email attachment to the mobile phone client application of the mobile phone 100.

S209: The mobile phone client application sends the path of the soft link of the email attachment to the PC client application of the PC 200, that is, returns the path of the soft link of the email attachment to the PC client application of the PC 200.

S210: After receiving the path of the soft link of the email attachment, the PC client application directly invokes a system, so that the system finally invokes an open interface of the file sharing module in the PC 200, and sends an open request to the file sharing module in the PC 200, where the open request includes the path of the soft link of the email attachment. The open interface is an interface for opening the email attachment, and an input parameter of the open interface is the path of the soft link, so that the PC client application can access the path of the soft link, and the soft link corresponding to the path of the soft link is determined from the file sharing module in the PC 200.

S211: After receiving the open request, the file sharing module in the PC 200 determines, based on the path of the soft link of the email attachment included in the open request, the soft link corresponding to the path of the soft link in the file sharing module in the PC 200, and determines the fd corresponding to the path of the soft link. Then, the file sharing module in the PC 200 sends the fd to the PC client application.

After obtaining the fd, the PC client application of the PC 200 may directly read and write a file based on location information of a mailbox application included in the soft link and the fd. The location information of the mailbox application may be an absolute path of the foregoing mailbox application, and may be determined based on the foregoing URI.

According to the file access method provided in this implementation, the soft link created by the mobile phone 100 for the email attachment that the PC 200 requests to access is stored in the shared directory of the file sharing module in the mobile phone 100, that is, the email attachment is mapped to the shared directory, and the correspondence between the path of the soft link and the fd is stored in the data structure of the file sharing module in the mobile phone 100. In addition, the mobile phone 100 shares the shared directory, the data structure, and the like of the file sharing module in the mobile phone 100 to the file sharing module in the PC 200. The PC 200 may obtain, from the file sharing module in the PC 200, the soft link corresponding to the email attachment that is of the mobile phone 100 and that requests to be accessed, and may link to the email attachment based on the soft link. In addition, the PC 200 determines, based on the soft link, the fd required for accessing the email attachment, so that the PC 200 accesses the email attachment.

Figure 10:
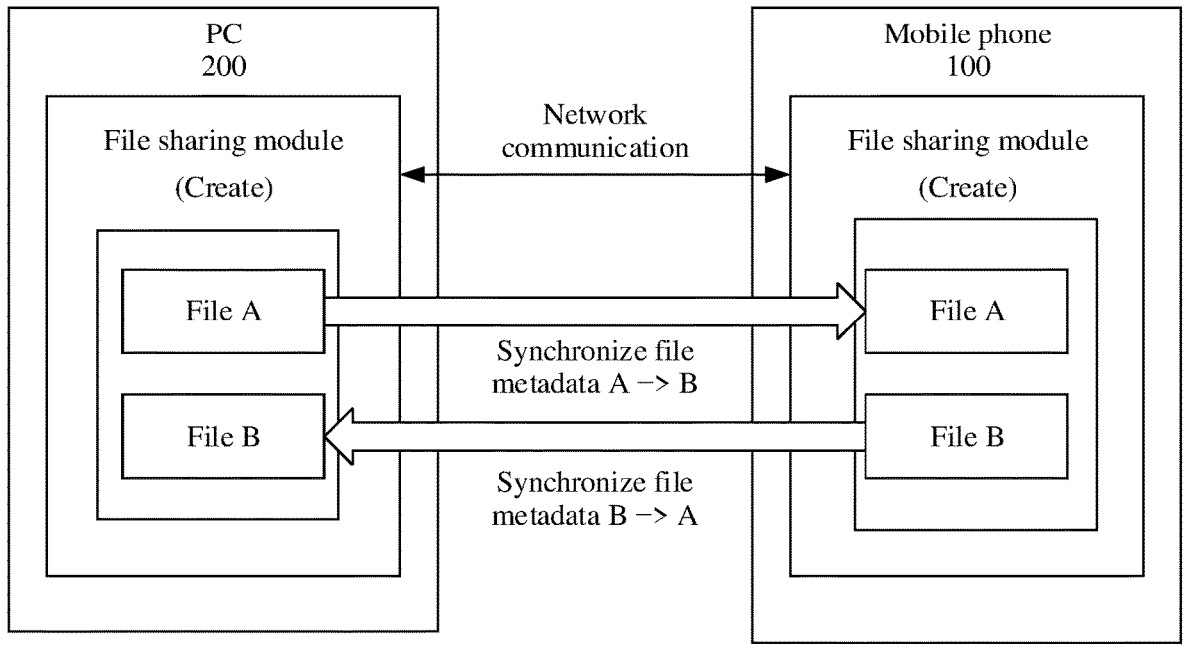
FIG. 10 is another schematic flowchart of establishing a communication connection and sharing a shared directory between a mobile phone 100 and a PC 200 in a file access method provided in this application according to some implementations of this application.

In another implementation of this application, refer to FIG. 10. After the PC 200 establishes a network communication connection to the mobile phone 100, and a collaboration function between the PC 200 and the mobile phone 100 is enabled, the PC 200 may create, in a file sharing module in the PC 200, a file A used as a shared directory for all sandbox files in the PC 200, and the mobile phone 100 may create, in a file sharing module in the mobile phone 100, a file B used as a shared directory for all sandbox files in the mobile phone 100. Then, the PC 200 shares or synchronizes file metadata of the file A that is in the file sharing module in the PC 200 and that is used as the shared directory to the file B that is in the file sharing module in the mobile phone 100 and that is used as the shared directory. The file metadata includes the foregoing soft link of the sandbox file and the correspondence between the path of the soft link and the fd. The mobile phone 100 shares or synchronizes file metadata shared by the file B that is in the file sharing module in the mobile phone 100 and that is used as the shared directory to the file A that is in the file sharing module in the PC 200 and that is used as the shared directory. After the PC 200 receives an access operation performed by a user on the sandbox file in the mobile phone 100, the PC 200 may obtain, from the mobile phone 100, a path of a soft link corresponding to the sandbox file that the PC 200 requests to perform an access operation, and determine, from the file sharing module in the PC 200 based on the path of the soft link, the soft link and an fd to directly access the sandbox file. After the mobile phone 100 receives an access operation performed by the user on the sandbox file in the PC 200, the mobile phone 100 may obtain, from the PC 200, a path of a soft link corresponding to the sandbox file that the mobile phone 100 requests to perform an access operation, and determine, from the file sharing module in the mobile phone 100 based on the path of the soft link, the corresponding soft link and an fd to directly operate the file.

In this implementation, the file sharing modules are respectively created in the mobile phone 100 and the PC 200, and the shared directory and the data structure of the file sharing module in the mobile phone 100 and the file sharing module in the PC 200 are mutually shared, so that the file sharing module in the mobile phone 100 and the file sharing module in the PC 200 maintain one shared directory. A name of the shared directory in different devices is the same. The file sharing module has a network communication capability and a distributed capability. On the two devices of the mobile phone 100 and the PC 200 where the file sharing module is deployed, file metadata of different devices is synchronized. A file (for example, the foregoing soft link) created in the shared directory of the mobile phone 100 device may be accessed on the PC 200 through a network. On the contrary, a file created on the PC 200 may also be accessed on the mobile phone 100.

In some other implementations of this application, the foregoing soft link may also be another mapping file (the mapping file may also be referred to as an image file) corresponding to the sandbox file, and the PC 200 may determine an address of the sandbox file based on the mapping file. Certainly, the fd may also be other file index information required for accessing the sandbox file, and the PC 200 may determine, based on the file index information, a sandbox file to be opened or to be read/written.

In this application, the foregoing mailbox application may also be any other type of application of the mobile phone 100, for example, a multimedia playing application like a social application, a web browser application, a video application, or a music application. The foregoing sandbox file may also be a file of another type.

In this application, the sandbox file may be a file like a document or an image corresponding to an application, or may be a configuration file of the application. For example, cache data and a database file. The sandbox file may also be referred to as a private file of an application.

In this application, the trigger operation that is performed by the user on the sandbox file and that is detected by the PC 200 may be a detected click operation that is performed by the user by using a mouse on the "Download" control corresponding to the sandbox file, or may be a detected touch operation that is performed by the user on the "Download" control corresponding to the sandbox file, or may be a detected click operation that is performed by the user on the sandbox file, or a detected operation that the user flicks a display interface on the sandbox file. Correspondingly, the operation type information and the operation area information may be information corresponding to the trigger operation, and details are not described herein again.

In this application, a manner of enabling collaboration function between the mobile phone 100 and the PC 200 may also be another manner.

In this application, the network communication connection established between the mobile phone 100 and the PC 200 may be a communication connection established based on another type of wireless local area network (WLAN). A near field communication connection may also be established between the mobile phone 100 and the PC 200 in a manner like "Tap", and the foregoing cooperative application may be opened to enable a cooperation function.

In this application, the sandbox file may also be an application private file corresponding to an application of the electronic device.

In this application, the mobile phone 100 may also be an electronic device like a tablet computer or a wearable device, and the PC 200 may also be another electronic device like a television or a smart screen.

Figure 11:
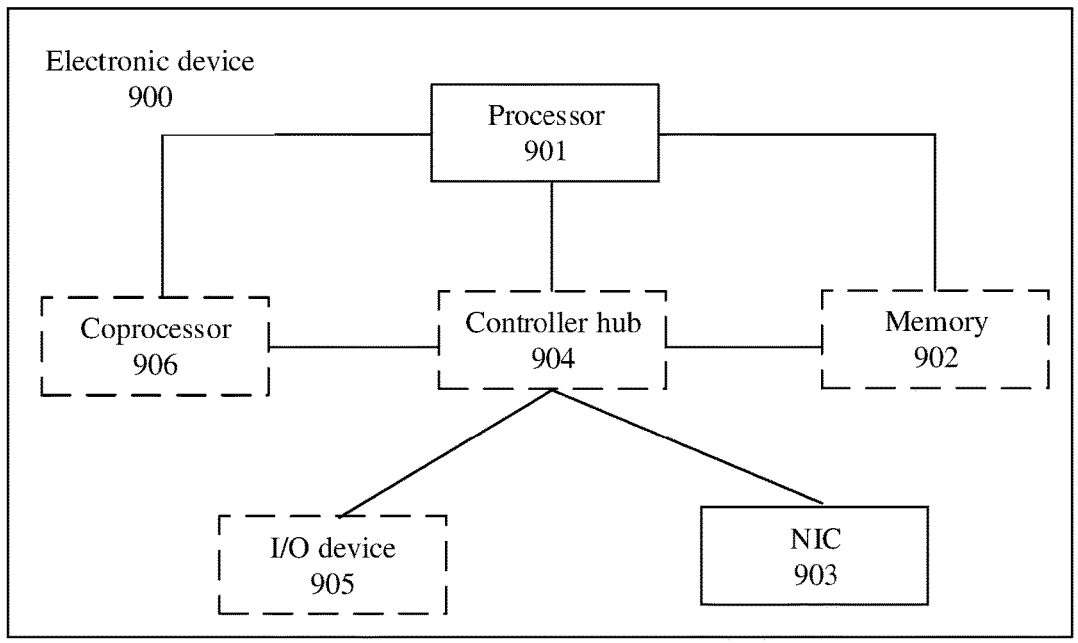
FIG. 11 is a schematic diagram of a structure of an electronic device according to some implementations of this application.

Refer to FIG. 11. FIG. 11 is a schematic diagram of a structure of an electronic device 900 according to an implementation of this application. The electronic device 900 may include one or more processors 901 coupled to a controller hub 904. For at least one embodiment, the controller hub 904 communicates with the processor 901 through a multi-branch bus like a front side bus (FSB), a point-to-point interface like a quick path interconnect (QPI), or a similar connection. The processor 901 executes an instruction for controlling a processing operation of data of a general type. In an embodiment, the controller hub 904 includes but is not limited to a graphics memory controller hub (GMCH) (not shown in the figure) and an input/output hub (IOH) (which may be on separate chips) (not shown in the figure). The GMCH includes a memory and a graphics controller and is coupled to the IOH.

The electronic device 900 may further include a coprocessor 906 and a memory 902 that are coupled to the controller hub 904. Alternatively, one or both of the memory 902 and the GMCH may be integrated into the processor 901 (as described in this application), the memory 902 and the coprocessor 906 are directly coupled to the processor 901 and the controller hub 904, and the controller hub 904 and the IOH are located in a single chip.

The memory 902 may be, for example, a dynamic random access memory (DRAM), a phase change memory (PCM), or a combination thereof.

In an embodiment, the coprocessor 906 is a dedicated processor, for example, a many integrated core (MIC) processor, a network or communication processor, a compression engine, a graphics processor, a general-purpose graphics unit (GPGPU), or an embedded processor. An optional property of the coprocessor 906 is shown in FIG. 11 with a dashed line.

In an embodiment, the electronic device 900 may further include a Network Interface Card (NIC) 903. The network interface 903 may include a transceiver, configured to provide a radio interface for the electronic device 900, to communicate with any other suitable device (for example, a front-end module or an antenna). In various embodiments, the network interface 903 may be integrated with another component of the electronic device 900. The network interface 903 may implement a function of the communication unit in the foregoing embodiment.

The electronic device 900 may further include an input/output (I/O) device 905. The input/output (I/O) device 905 may include a user interface designed to enable a user to interact with the electronic device 900; a peripheral component interface designed to enable a peripheral component to also interact with the electronic device 900; and/or a sensor designed to determine an environmental condition and/or location information related to the electronic device 900.

It should be noted that FIG. 11 is merely an example. That is, although FIG. 11 shows that the electronic device 900 includes a plurality of components such as the processor 901, the controller hub 904, and the memory 902, in actual application, a device using the methods in this application may include only some of the components of the electronic device 900, for example, may include only the processor 901 and the NIC 903. Properties of optional components in FIG. 11 are shown with dashed lines.

The memory of the electronic device 900 may include one or more tangible and non-transitory computer-readable media for storing data and/or instructions. The computer-readable storage medium stores instructions, and specifically stores a temporary and permanent copy of the instructions.

In this application, the electronic device 900 may be specifically a terminal device such as a mobile phone, a tablet computer, a personal digital assistant (PDA), or a desktop computer. The instructions stored in the memory of the electronic device may include instructions that cause the electronic device to implement the file access method mentioned above when the instructions are executed by at least one unit in the processor.

Figure 12:
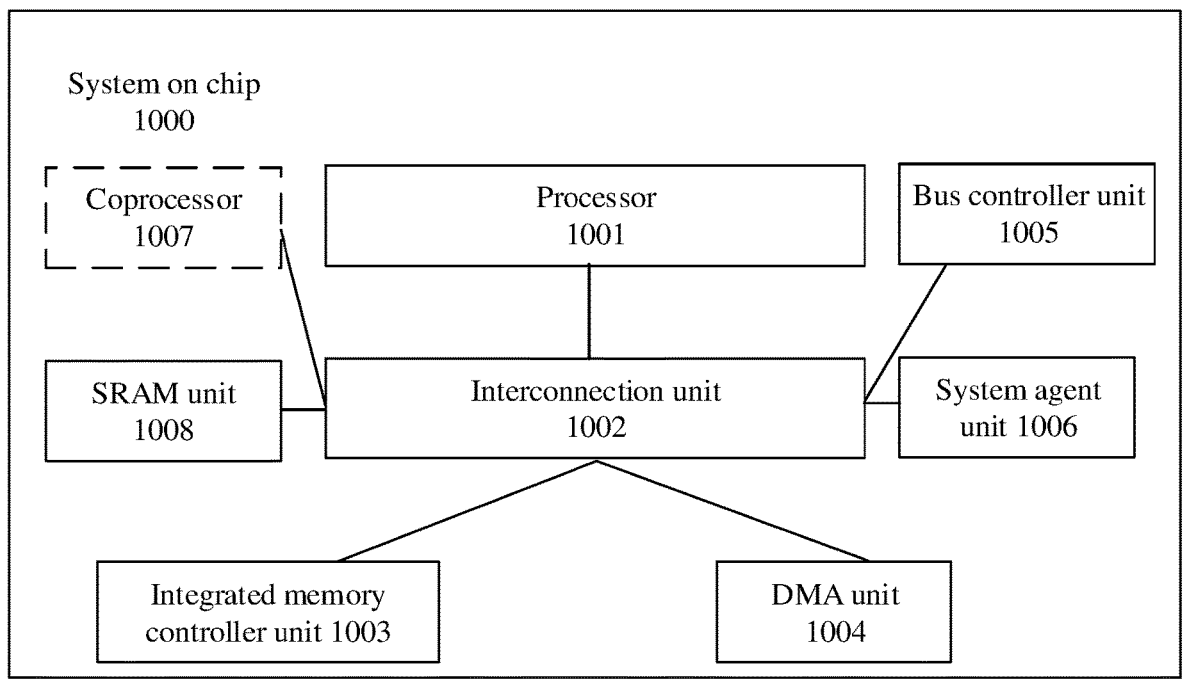
FIG. 12 is a schematic diagram of a structure of a system on chip (SoC) according to some implementations of this application.

Refer to FIG. 12. FIG. 12 is a schematic diagram of a structure of an SoC (System on Chip) 1000 according to an implementation of this application. In FIG. 12, similar parts have a same reference sign. In addition, a dashed box is an optional feature of a more advanced SoC 1000. The SoC 1000 may be configured to implement a corresponding function based on any electronic device in this application, different devices in which the SoC 1000 is located, and different instructions stored in the SoC 1000.

In FIG. 12, the SoC 1000 includes: an interconnection unit 1002, coupled to a processor 1001; a system agent unit 1006; a bus controller unit 1005; an integrated memory controller unit 1003; a group of coprocessors 1007 or one or more coprocessors 1007 including integrated graphics logic, an image processor, an audio processor, and a video processor; a static random access memory (SRAM) unit 1008; and a direct memory access (DMA) unit 1004. In an embodiment, the coprocessor 1007 includes a dedicated processor, for example, a network or communication processor, a compression engine, a GPGPU, a high-throughput MIC processor, or an embedded processor.

The SRAM unit 1008 may include one or more computer-readable media for storing data and/or instructions. The computer-readable storage medium may store instructions, and specifically store a temporary and permanent copy of the instructions. The instructions may include instructions that cause the electronic device to implement the file access method mentioned above when the instructions are executed by at least one unit in the processor 1001.

It should be noted that terms "first", "second", and the like are used only for distinguishing descriptions, and cannot be understood as indicating or implying relative importance.

It should be noted that, in the accompanying drawings, some structural or method features may be shown in a particular arrangement and/or order. However, it should be understood that such a particular arrangement and/or order may not be required. Instead, in some embodiments, these features may be arranged in a manner and/or an order different from those shown in the illustrative accompanying drawings. In addition, inclusion of the structural or method features in a particular figure does not imply that these features are required in all embodiments, and in some embodiments, these features may not be included or may be combined with another feature.

Although this application has been illustrated and described with reference to some implementations of this application, a person of ordinary skill in the art should understand that the foregoing content is further detailed descriptions of this application with reference to specific implementations, and it cannot be considered that specific implementations of this application are merely limited to these descriptions. A person skilled in the art may make various changes in form and details, including making several simple deductions or replacements, without departing from the spirit and scope of this application.

What is claimed is:

1. A file access method, comprises:
    displaying, by a first electronic device, a shared interface sent by a second electronic device that establishes a communication connection to the first electronic device, wherein the shared interface comprises a sandbox file corresponding to an application of the second electronic device;
    receiving, by the first electronic device, a trigger operation performed by a user on the sandbox file;
    sending, by the first electronic device, an access request to the second electronic device;
    receiving, by the first electronic device, mapping information sent by the second electronic device; and
    accessing, by the first electronic device, the sandbox file based on the mapping information, wherein the mapping information corresponds to the sandbox file and is determined by the second electronic device based on the access request, and the mapping information comprises a mapping file corresponding to the sandbox file, a path of the mapping file, and a correspondence between the path of the mapping file and file index information of the sandbox file.

2. The file access method according to claim 1, wherein accessing, by the first electronic device, the sandbox file based on the mapping information comprises:
    determining, by the first electronic device, the mapping file and the file index information based on the path of the mapping file; and accessing, by the first electronic device, the sandbox file based on the mapping file and the file index information.

3. The file access method according to claim 1, wherein the mapping file is a soft link file, and the mapping file comprises location information of the sandbox file.

4. The file access method according to claim 1, wherein the file index information is a file descriptor.

5. The file access method according to claim 1, wherein the access request comprises operation type information and operation area information corresponding to the trigger operation.

6. A file access method, comprising:
receiving, by a second electronic device, an access request sent by a first electronic device that establishes a communication connection to the second electronic device;
determining, by the second electronic device based on the access request, mapping information corresponding to a sandbox file that the first electronic device requests to access, wherein the mapping information comprises a mapping file corresponding to the sandbox file, a path of the mapping file, and a correspondence between the path of the mapping file and file index information of the sandbox file, the access request is generated by receiving a trigger operation performed by a user on the sandbox file, and the sandbox file corresponds to an application of the second electronic device and is comprised in a shared interface that is sent by the second electronic device and displayed by the first electronic device; and
sending, by the second electronic device, the mapping information to the first electronic device, wherein the first electronic device accesses the sandbox file based on the mapping information.

7. The file access method according to claim 6, wherein determining, by the second electronic device based on the access request, the mapping information corresponding to the sandbox file comprises:
determining, by the second electronic device, the sandbox file based on the access request;
determining, by the second electronic device, a uniform resource identifier corresponding to the sandbox file;
determining, by the second electronic device based on the uniform resource identifier, the file index information corresponding to the uniform resource identifier; and
determining, by the second electronic device, the mapping information based on the uniform resource identifier and the file index information.

8. The file access method according to claim 6, wherein the mapping file is a soft link file, and the mapping file comprises location information of the sandbox file.

9. The file access method according to claim 6, wherein the file index information is a file descriptor.

10. The file access method according to claim 6, wherein the access request comprises operation type information and operation area information corresponding to the trigger operation.

11. A first electronic device, comprising:
at least one processor; and
at least one memory coupled to the at least one processor and storing programming instructions for execution by the at least one processor to cause the first electronic device to perform operations comprising:
displaying a shared interface sent by a second electronic device that establishes a communication connection to the first electronic device, wherein the shared interface comprises a sandbox file corresponding to an application of the second electronic device;
receiving a trigger operation performed by a user on the sandbox file;
sending an access request to the second electronic device;
receiving mapping information sent by the second electronic device; and
accessing the sandbox file based on the mapping information, wherein the mapping information corresponds to the sandbox file and is determined by the second electronic device based on the access request, and the mapping information comprises a mapping file corresponding to the sandbox file, a path of the mapping file, and a correspondence between the path of the mapping file and file index information of the sandbox file.

12. The first electronic device according to claim 11, wherein the operations comprise:
determining the mapping file and the file index information based on the path of the mapping file; and
accessing the sandbox file based on the mapping file and the file index information.

13. The first electronic device according to claim 11, wherein the mapping file is a soft link file, and the mapping file comprises location information of the sandbox file.

14. The first electronic device according to claim 11, wherein the file index information is a file descriptor.

15. The first electronic device according to claim 11, wherein the access request comprises operation type information and operation area information corresponding to the trigger operation.

* * * * *